US011763334B2

United States Patent
Sridhar

(10) Patent No.: US 11,763,334 B2
(45) Date of Patent: Sep. 19, 2023

(54) MACHINE LEARNING BASED CUSTOMIZED NOTIFICATION GENERATION AND AUTHENTICATION SYSTEM

(71) Applicant: Capital One Services, LLC, McLean, VA (US)

(72) Inventor: Andrew Sridhar, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/336,879

(22) Filed: Jun. 2, 2021

(65) Prior Publication Data

US 2022/0391938 A1    Dec. 8, 2022

(51) Int. Cl.
     *G06Q 30/02*      (2023.01)
     *G06Q 30/0207*      (2023.01)
     *G06N 20/00*      (2019.01)
     *G06Q 30/0251*      (2023.01)

(52) U.S. Cl.
     CPC ......... *G06Q 30/0224* (2013.01); *G06N 20/00* (2019.01); *G06Q 30/0223* (2013.01); *G06Q 30/0239* (2013.01); *G06Q 30/0261* (2013.01)

(58) Field of Classification Search
     CPC ........... G06Q 30/0224; G06Q 30/0223; G06Q 30/0239; G06Q 30/0261; G06N 20/00
See application file for complete search history.

(56) References Cited

U.S. PATENT DOCUMENTS

| | | | |
|---|---|---|---|
| 9,092,773 B2 | 7/2015 | Daly et al. | |
| 9,390,145 B2* | 7/2016 | Weiss | G06Q 30/0261 |
| 10,169,761 B1* | 1/2019 | Burger | G06Q 10/0635 |
| 11,218,487 B1* | 1/2022 | Iles | G06N 20/00 |
| 2011/0029370 A1* | 2/2011 | Roeding | H04W 4/021 |
| | | | 705/14.38 |
| 2011/0238476 A1* | 9/2011 | Carr | G06Q 30/00 |
| | | | 705/14.1 |
| 2012/0078682 A1 | 3/2012 | Pinsley et al. | |
| 2012/0166333 A1 | 6/2012 | von Behren et al. | |
| 2012/0203632 A1 | 8/2012 | Blum et al. | |

(Continued)

OTHER PUBLICATIONS https://www.ourcart.com/products.

*Primary Examiner* — Dipen M Patel
(74) *Attorney, Agent, or Firm* — Banner & Witcoff, Ltd.

(57) ABSTRACT

A system for employing machine learning to generate customized notifications for a user is provided. The system may identify a landmark in proximity to a user's mobile device and may obtain information associated with products or services offered by the landmark. While the mobile device is within a predetermined distance of the landmark, a machine learning model may be employed to generate a customized notification, such as an offer—e.g., a discount or a special financing offer for one of the identified products—generated specifically for use by the user based on the user's spending and/or financing history. The customized notification may be transmitted to the mobile device with a security key for accessing the offer. In response to receiving an indication that the security key was selected and the product purchased, the user may be authenticated and the offer may be applied to an account associated with the user.

21 Claims, 10 Drawing Sheets

(56) References Cited

U.S. PATENT DOCUMENTS

| | | | | |
|---|---|---|---|---|
| 2013/0060637 A1* | 3/2013 | Walker | ............... | G06F 16/24578 |
| | | | | 705/14.58 |
| 2014/0095985 A1 | 4/2014 | Argue et al. | | |
| 2017/0236160 A1* | 8/2017 | Oberoi | ............... | G06Q 30/0269 |
| | | | | 705/14.66 |
| 2019/0205939 A1* | 7/2019 | Lal | ............... | G06Q 30/0631 |
| 2019/0385145 A1* | 12/2019 | Abdelkader | ......... | G06Q 30/0222 |
| 2020/0126085 A1* | 4/2020 | Roche | ............... | G06Q 20/4014 |
| 2020/0273013 A1* | 8/2020 | Garner | ............... | G06Q 10/087 |

* cited by examiner

MACHINE LEARNING BASED CUSTOMIZED NOTIFICATION GENERATION AND AUTHENTICATION SYSTEM

FIELD OF USE

Aspects of the disclosure relate generally to notification generation methods, and more particularly to methods of employing machine learning to generate customized notifications (e.g., offers) and methods of authenticating redemption of an offer.

BACKGROUND

Computing devices are often used to help users shop for and purchase items, but such devices are often limited in their ability to help users shop in traditional brick-and-mortar stores. For example, while a user might be able to use their smartphone to quickly search for products and deals on a website, a user might not be able to use their smartphone when trying to find a hard-to-find ingredient in a grocery store or when trying to find a good deal on a particular item of interest sold by a brick and mortar merchant not offering a deal on the product. However, the increasing popularity of portable and wearable devices has made it increasingly easy to receive information about shoppers, such as their location in a store, their past shopping history, product interests, spending proclivity, financial health, credit-worthiness, or the like.

SUMMARY

The following presents a simplified summary in order to provide a basic understanding of various aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the detailed description below.

Aspects of the disclosure relate to systems, apparatuses, computer-readable media, and methods for generating and providing to users, in real-time, customized notifications (e.g., purchase offers) while the user is within a predetermined distance from a landmark, such as a merchant store. Information about the user's spending habits, payments habits, purchase history (such as products or services purchased, types and locations of merchants or vendors purchased from, etc.), web browsing habits, hobbies, and/or interests may be monitored, collected, and/or analyzed to make determinations about the types of products or services the user is interested in, the user's financial health, credit-worthiness, etc. and customized notification (e.g., purchase offers) may be generated based on the determinations. For example, based on determining that a history of purchases made by a user indicate that the user is vegetarian, the user might be provided a discount code for a new vegetarian meal kit. The notification (e.g., purchase offer) may be generated in real-time while the user is in proximity to a product determined to be of interest to the user. For example, a notification about an offer for a toothbrush might be generated in real-time when a user walks into a dental care aisle in a grocery store. In accordance with an aspect of the disclosure, a location of the user may be determined and, based on the location of the user, a landmark within a predetermined distance of the user may be identified. The landmark might be, for example, another computing device (e.g., a point-of-sale system), a store, an aisle in the store, or the like. Products or services offered for sale at the landmark may further be determined and, while the user is within proximity to the landmark, a trained machine learning model may be used to generate and select customized notifications for products determined to be of interest to the user and offered for sale at the landmark. The user may be notified while the user is within proximity of the landmark, such as while the user is shopping in the landmark. The notification may include a unique security key usable by the user to redeem the offer and usable by the system to authenticate that the user for whom the notification was generated is the individual redeeming the offer. Upon successfully authenticating redemption of the offer and receiving valid proof of purchase, the offer may be applied directly to an account of the user, such as a bank account or a credit card account. The trained machine learning model might be updated based on, for example, the acceptance of the offer by the user. The trained machine learning model might additionally be updated based on a rejection of the offer by the user.

These and other features and advantages of the disclosure will be apparent from the detailed description provided below.

BRIEF DESCRIPTION OF THE DRAWINGS

Some features are shown by way of example, and not by limitation, in the accompanying drawings. In the drawings, like numerals reference similar elements.

FIGS. 4A-4G are example user interfaces of an application used in a notification generation and authentication system, in accordance with one or more aspects described herein.

DETAILED DESCRIPTION

Figure 1:
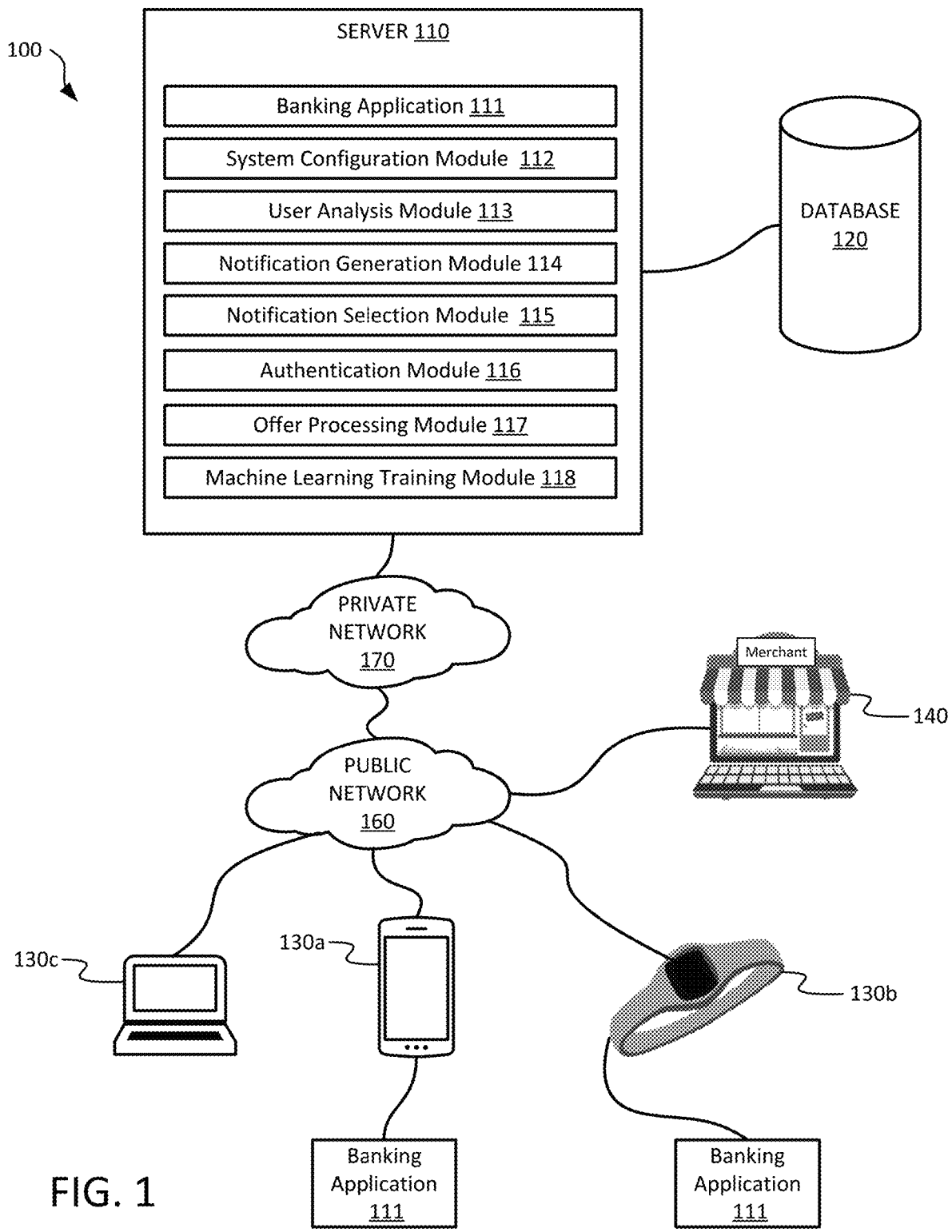
FIG. 1 illustrates an example computing environment for implementing a notification generation and authentication system, in accordance with one or more aspects described herein.

In the following description of the various embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

Aspects described herein improve the functioning of computers by improving the process in which notifications (e.g., regarding products) are provided to users. At present, notifications regarding financial transactions (e.g., product offers) are generally provided to users via e-mail, text messages, or other methods. Such notifications are extremely limited in that they often are based on past activity by the user online, without respect to their present location and their shopping habits. Moreover, such notifications are often pre-programmed and applicable to large populations, and thus are not specific to a user, such that they might be ignored. As a result, modern notifications are often computationally wasteful: today, large amounts of e-mail traffic (and thus Internet bandwidth, file storage, or the like) is devoted to useless marketing messages. The present system is significantly more targeted: rather than blasting e-mails or text messages out to a potentially disinterested audience, the present system individualizes notifications in a manner which increases the likelihood that a user will react to them. In this way, rather than sending millions of e-mails out, organizations might instead send a smaller set of targeted notifications to users as they, for example, browse throughout physical stores.

As a preliminary introduction to the discussion below, aspects described herein relate to leveraging various sources of data about a user to provide that user notifications regarding offers for products, services, financial transactions, or the like. By leveraging the location of a user (as determined, e.g., by using GPS coordinates received from the user's personal devices, by using WI-FI or cellular triangulation techniques, etc.) and information about that user (e.g., their purchase habits, preferences, etc.), the system described herein can provide notifications (e.g., customized offers) to a user. For instance, a user might be provided an offer, such as a discount for a new product, favorable financing terms for a specific product, or the like, when the user is within a predetermined proximity of that new product in a store. This system thereby leverages a variety of data related to a user to provide that user with notifications (e.g., custom offers) which might otherwise not be provided in real-life shopping opportunities. Indeed, in many respects, the process described herein leverages user data and user location information to provide the user with a shopping experience not dissimilar to an online shopping experience.

Aspects discussed herein may relate to methods, systems, devices, and computer-readable media for a notification generation and authentication system.

Referring to FIG. 1, an example computing environment for an notification generation and authentication system 100 is provided. The notification generation and authentication system 100 may include one or more systems or computing devices, such as a server 110, a database 120, one or more user computing devices 130 (e.g., a first user computing device 130a, a second user computing device 130b, and/or a third user computing device 130c), one or more merchant computing devices 140, a public network 160, and a private network 170. Although the various systems and computing devices in the computing environment 100 are shown and described as separate devices, one or more of the computing devices, may be part of a single computing device without departing from the disclosure.

The server 110 may be a computing device, such as a server, used by a banking institution or other financial institution to provide functionality associated with generating customized purchase offers to provide to its users. The users may hold a transaction account, such as a bank account, a credit card account, a commercial account, a line of credit, or the like, maintained by the banking institution. The banking institution may generate, using one or more trained machine learning models, customized or personalized notification regarding one or more products or services.

The notification may be generated based on a combination of factors, such as the user's proclivity for certain products and/or services, the user's spending proclivity, the determined financial health and/or credit risk associated with the user, a geographical location of the user, or the like. The notification may include, for example, an offer related to a discounted price for purchasing a specific product or a service, a rebate that may be applied after purchasing a specific product or service, a micro-credit offer (e.g., a reduced or promotional interest rate, no required minimum payments for a period of time, a credit limit increase, or the like) associated with the purchase of a specific product or service, an advertisement for a product or service, a warning about a product or service (e.g., an allergy notice regarding a product), a recommendation, or the like. The generated notification (e.g., an offer) may be independent of a promotional offer provided by a merchant or an entity associated with the product or service, and may be a notification related to an offer made by the banking institution and applied to the user's transaction account by the banking institution upon proof of purchase of the product or service. The notification may be transmitted to the user via a user device associated with the user. The notification may be acknowledged by the user. In the case that the notification is related to an offer, the user may redeem the offer by accessing the notification and the notification may be configured such that only the user for whom the notification was generated may redeem the offer. To this end the user may be authenticated upon attempting to redeem the offer. If the user is successfully authenticated, the offer may be redeemed by the user. Upon confirmation or proof that a purchase associated with the offer was made, the offer may be processed and applied to a transaction account associated with the user. After the offer has been redeemed and processed, one or more trained machine learning models may be updated with information associated with conditions under which the successful redemption of the offer occurred. For example, the training model may be updated with information including the product or service associated with the offer; a merchant at which the product or service was purchased; a date and time of transmission of the notification regarding the offer; a date and time that the offer was accessed by the user; a date and time that the offer was redeemed; a date and time associated with the purchase transaction; a value associated with the offer; a type of the offer; a price of the product or service; a distance, at the time the offer was generated, between a location of the user and a location of the merchant from whom the product or service was purchased; and/or a distance between the location of user and the location of merchant when the offer was accessed.

In the case that the notification is related to an offer, if the user does not access the offer within a predefined period a time, the offer may be canceled or rescinded and the user may be unable to access the offer. The one or more trained machine learning models may be updated in this case as well. For example, the training machine learning model may be updated with information including the product or service associated with the offer; a merchant offering the product or service for sale; a date and time of transmission of the notification regarding the offer; a value associated with the offer; a type of the offer; a price of the product or service; and/or a distance, at the time the offer was generated, between a location of the user and a location of the merchant offering the product or service for sale.

The server 110 may include one or more modules or applications, such as a banking application 111, a system configuration module 112, a user analysis module 113, a notification generation module 114, a notification selection module 115, an authentication module 116, an offer processing module 117, and a machine learning training module 118.

The banking application 111 may be an application controlled by the server 110. The banking application 111 may be associated with the user's bank account, credit card account, commercial account, line of credit, or the like. The banking application 111 may be used by the user to perform various account-related functions, such as viewing account transactions, making payments, depositing checks, transferring funds, sending funds, etc. Additionally or alternatively, the banking application 111 may be used to receive and redeem customized offers for the purchase of products or services.

The banking application 111 may be a server-based application installed and executed at the server 110. The server-based banking application 111 may be accessed through a website, such as a banking website, by a client device, such as by the third user computing devices 130c. Additionally or alternatively, the banking application 111 may be a client-based application installed and executed on a client device, such as the first user computing device 130a and/or the second user computing device 130b.

Figure 4A:
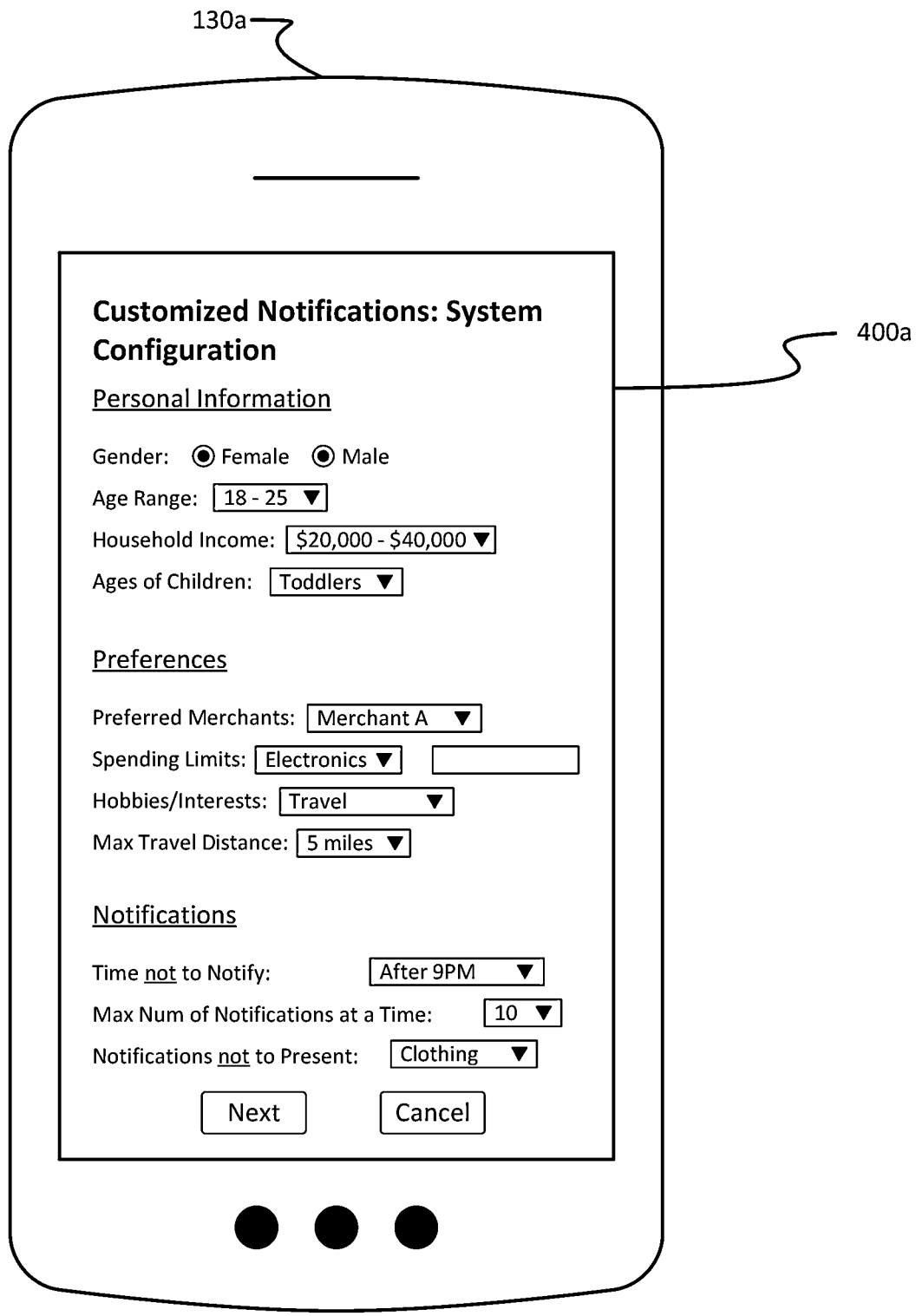
Figure 4B:
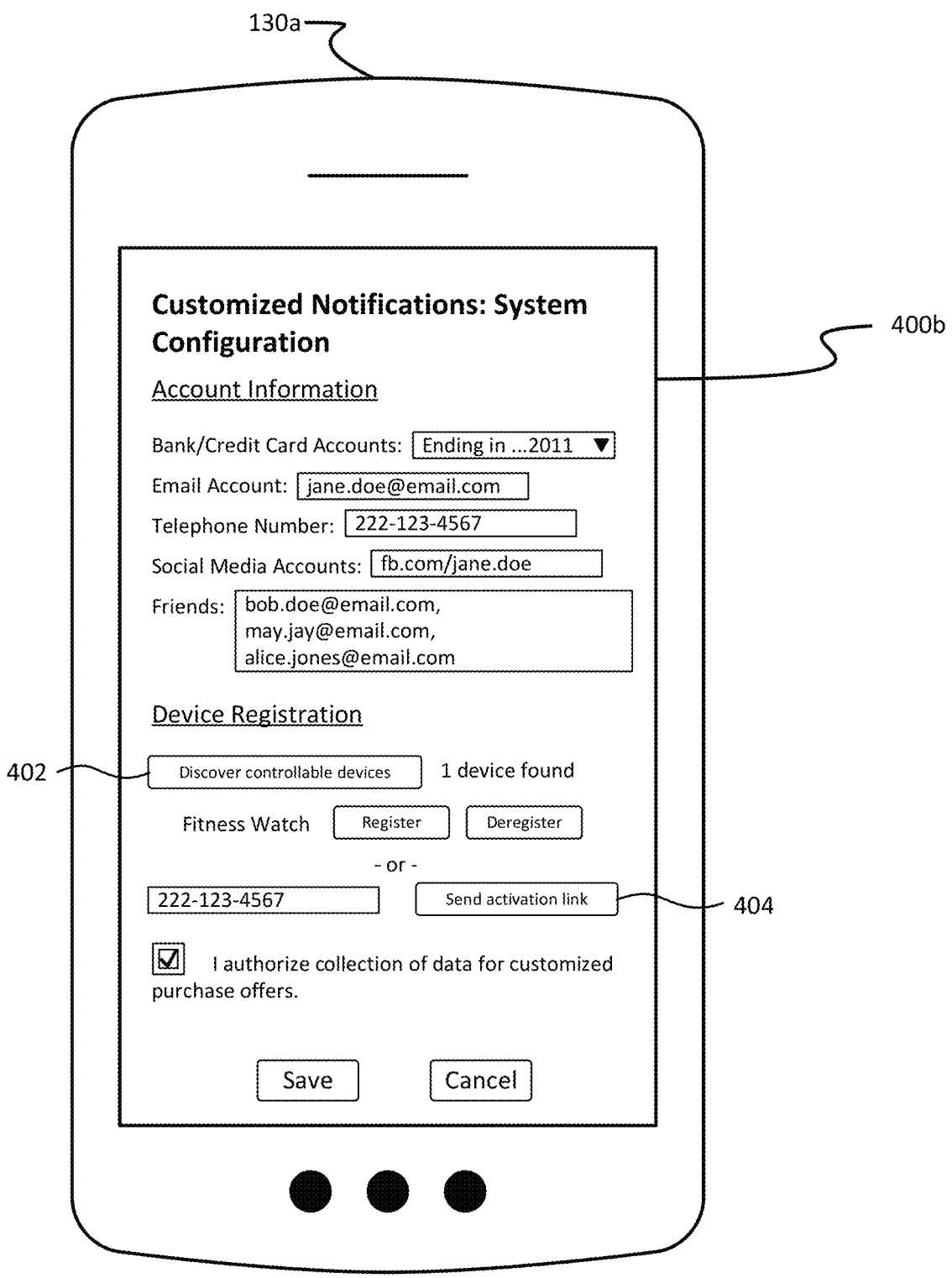

The system configuration module 112 may be used by the server 110 to configure one or more aspects of the notification generation and authentication system 100. The server 110 may cause the system configuration module 112 to control a download of the banking application 111 to the one or more user computing devices 130, upon request by a user. In some cases, downloading may additionally or alternatively include downloading one or more web browser extensions including scripts for capturing web browsing associated with online shopping. For instance, the user may make a request via an online app store or other website to download the banking application 111 and/or a web browser extension to the first user computing device 130a. In this case, the server 110 may control the system configuration module 112 to download the banking application 111 to the first user computing device 130a. Once downloaded, the server 110 may cause the system configuration module 112 to output a user interface, such as user interface 400a and/or 400b shown in FIGS. 4A and 4B, via the banking application 111, for configuring the notification generation and authentication system 100. While reference is made to the first user computing device 130a here and throughout the description, such reference is for convenience of description only and any of the one or more user computing devices 130 may be interchangeably used.

The user interface, such as shown in user interface 400a, may provide options for the user to input personal information such as gender, age, household income, number and/or ages of children, etc. In some instances, the user interface may be prepopulated with personal information already know about the user and maintained in the database 120. The user interface, such as shown in user interface 400a, may additionally provide options for entering user preferences related to the notification generation and authentication system 100, such as preferred merchants, hobbies, interests, spending limits, a maximum distance willing to travel to purchase a product or service, etc. The user interface, such as shown in user interface 400a, may additionally provide options for entering preferences related to notifications, such as a time for presenting notifications or not presenting notification, a maximum number of notifications to present at a time, types of notifications that should or should not be presented to the user, or the like. The user interface, such as shown in user interface 400b, may additionally provide options for the user to identify one or more bank accounts, credit card accounts, or the like that should be used with the notification generation and authentication system 100 to collect the user's purchase history and monitor the user's spending and payment habits. The user interface, such as user interface 400b, may additionally provide options for entering information for one or more social media accounts associated with the consumer. The social media accounts may be scanned and monitored to collect data associated with the user's spending habits, hobbies, interests, etc. The user interface, such as user interface 400b, may additionally provide options for entering information for one or more email accounts associated with the consumer. The email accounts may be scanned and monitored to collect data associated with the user's spending. For instance, the email accounts may be monitored for purchase receipts or invoices.

The user interface, such as user interface 400b, may additionally provide options for entering information for one or more social media accounts associated with friends or acquaintances of the user, so that a network of friends may be established for identifying spending habits, hobbies, interests, etc. of the group of individuals making up the network. The notification generation and authentication system 100 may seek authorization from each of the identified friends and acquaintances to participate in the notification generation and authentication system 100 and to have their social media accounts and/or other accounts scanned and monitored to collect information associated with their spending habits, hobbies, interests, etc. in exchange for customized purchase offers. The notification generation and authentication system 100 may provide additional notifications (e.g., offers) or offers of increased value to users based on the number of individuals in the user's network of friends.

The user interface, such as shown in user interface 400b, may additionally provide an option for the user to register one or more devices that may be used for receiving and accessing the customized offers. For instance, the user interface, such as shown in user interface 400b, may display a button 402 used to initiate a device discovery process for discovering devices to be registered. The device discovery process may identify devices in various ways. For example, the device discovery process may identify device that are connected to a network, such as the public network 160, to which the first user computing device 130a is also connected. The device discovery process may identify devices within a certain proximity of the first user computing device 130a using communication protocols such as Bluetooth, Zigbee, Wi-Fi Direct, near-field communication (NFC), or the like. A list of the discovered devices may be displayed on the user interface, and the user may select one or more of the discovered devices to register the devices with the system. In some instances, the user interface 400b may provide an option, such as via button 404, for the user to request to receive an activation link for registering a device. The user interface may provide an option for the user to enter an email or a telephone number for receiving the activation link and the server 110 may cause the system configuration module 112 to send a message comprising the activation link to the provided email or telephone number. The user may thereafter select the activation link from a device the user wishes to register. Upon selection, a script associated with the activation link may capture identification information associated with the device from which the selection is made and may cause the system configuration module 112 to register the device with the notification generation and authentication system 100 using the captured identification information. Additionally or alternatively, the user may manually register a device by providing identification information for the device, such as a MAC address of the device. The user interface may also provide options for deregistering previously registered devices that the user no longer wishes to be associated with the notification generation and authentication system 100

The user interface, such as user interface 400*b*, may additionally request that the user provide permission for the notification generation and authentication system 100 to track, monitor, or collect information associated with the consumer's spending and shopping via the user's identified bank accounts, credit card accounts, social media accounts, web browsers, and/or registered devices.

The system configuration module 112 may cause information collected during the system configuration process to be stored in the database 120 and/or in a memory associated with the first user computing device 130*a*.

The user analysis module 113 may be used by the server 110 to collect and analyze data associated with the user for making determinations about customized notifications to generate for the user. Using the information provided during system configuration process, the user analysis module 113 may access the bank accounts, credit card accounts, etc. provided by the user to collect data associated with, for example, purchase transactions made by the user using the bank or credit card account. The user analysis module 113 may also collect information about payments made by the user for purchases, credit card bills, etc. The user analysis module 113 may cause information associated with the purchase transactions to be stored in the database 120 and/or in a memory associated with the first user computing device 130*a*.

In some cases, to collect more detailed information about the purchase transactions identified from the user's bank and/or credit card accounts, the user analysis module 113 may request and receive transaction line item detail information from a merchant associated with the purchase transaction. The user analysis module 113 may identify, from the purchase transaction information identified from the bank account or credit card account, a merchant and other identifying information associated with the purchase transaction. The user analysis module 113 may send to a computing device associated with the merchant, such as the merchant computing device 140, information identifying the transaction (as obtained from the identifying information associated with the purchase transaction), such as a transaction number, a date and time of the transaction, a location (e.g., city, state, zip code, etc.) of the merchant, a transaction amount, payment card information, or the like. The user analysis module 113 may receive from the merchant computing device 140, line item data associated with the purchase transaction. The line item data may include a name or description of the item purchased, a price of the item, and/or a quantity of the item purchased. The user analysis module 113 may cause the line item details of the purchase transactions to be stored in the database 120 and/or in a memory associated with the first user computing device 130*a*.

In some cases, the user analysis module 113 may collect more detailed information about the purchase transactions identified from the user's bank and/or credit card accounts, by providing the user with a user interface to capture and/or upload an image of a receipt associated with a purchase transaction. The user analysis module 113 may process the receipt using one or more image analysis and/or computer vision techniques, such as optical character recognition (OCR), object recognition, or the like, to convert one or more portions of the image of the receipt into text. After converting one or more portions of the image of the receipt to text, the user analysis module 113 may analyze the converted text to extract the line item purchase details from the text.

In some cases, the user analysis module 113 may use a template to extract the line item purchase details from the converted text. For instance, the user analysis module 113 may query a database, such as the database 120, to retrieve a template associated with a particular merchant. The database 120 may store different templates for different merchants. The template may specify the receipt format that the merchant uses. In particular, the template may specify a format of each line item for the particular merchant receipt. For instance, a template for a first merchant may specify that each line item on a receipt from that merchant begins with a product identifier, followed by a product name, which is followed by a product price. The user analysis module 113 may use the format specified by the template to extract the line item purchase details from the converted text of the receipt and to parse each of the line items to extract each line item element specified by the template, e.g., the product identifier, the product name, the product price, and/or other product related information.

In some cases, the user analysis module 113 may use a machine learning model to detect a layout of the receipt and make predictions about the various elements of the receipt. For instance, the machine learning model may predict that a section of text appearing in the center of the converted text in a tabular format likely corresponds to the line item purchase details associated with the transaction. The machine learning model may determine that each row corresponds to an individual line item and that each column corresponds to a particular element, such as a product identifier, a product name, and/or a product price. The user analysis module 113 may employ natural language processing techniques to identify the text that corresponds to each of the line items and elements. For instance, the user analysis module 113 may identify that a column containing all numbers is likely a product identifier, and a column containing text in a certain format, such as $xxx.xx is likely a product price, while a column containing all alphabetic characters is likely a product name. The user analysis module 113 may additional use a language model programmed with a library of product names to compare each line item and element to the language model to determine the product name appearing in the line item. After identifying the line item purchase details from the receipt, the user analysis module 113 may cause the line item purchase details to be stored in the database 120 and/or in a memory associated with the first user computing device 130*a*.

Additionally or alternatively, using the information provided during system configuration, the user analysis module 113, may monitor one or more email accounts of the user to identify emails containing purchase receipts or invoices. The user analysis module 113 may employ machine learning models to identify such receipts and to analyze the receipts in the manner described above to identify the line item purchase details. The user analysis module 113 may also monitor the email account to identify, using the machine learning models, payment notifications, including late or missed payment notifications, or the like. The machine learning models may scan the emails to identifying those using certain language, from certain recipients, or in certain formats to identify the receipts, invoices, and/or payment notifications. The user analysis module 113 may cause the line item purchase details and/or the payment information identified from the email to be stored in the database 120 and/or in a memory associated with the first user computing device 130a.

Using the information provided during system configuration, the user analysis module 113 may monitor one or more social media accounts of the user to collect data such as posts, comments, or images that may be indicative of purchases made by the user, spending habits, hobbies, interests, etc. The user analysis module 113 may employ a machine learning model to scan the user's images, posts, and/or comments for language that may indicate that the user made a purchase or is interested in a particular product. For instance, the user might post an image with a comment stating "Look what I just bought" or "Check out these shoes." The machine learning module may analyze the corresponding image to identify the product or the type of product depicted in the image. Alternatively or additionally, the user may post images without comments and the machine learning model may identify a number and/or frequency of postings of images of a certain type. For instance, the machine learning model may detect that the user posts many images of cars or many images about travel by analyzing the posted images. The user analysis module 113 may additionally determine one or more social media groups the user belongs to in order to identify the user's interests and hobbies.

The user analysis module 113 may additionally access one or more social media accounts of the user's friends and/or acquaintances as provided during the system configuration process. The user analysis module 113 may perform a scan and analysis of the social media posts, comments, images, groups, etc. of the user's friends and acquaintances to determine purchases, interests, hobbies, etc. of those individuals. In some instances, the user analysis module 113 may collect combined information associated with the purchases, interests, hobbies, etc. of the user's social media friends and acquaintances. In other instances, the user analysis module 113 may identify purchases, interests, hobbies, etc. that the group of social media friends and acquaintances have in common and only collect such common information. The user analysis module 113 may cause the collected information associated with the social media data to be stored in the database 120 and/or in a memory associated with the first user computing device 130a.

The user analysis module 113 may additionally monitor, using the downloaded browser extensions, the user's web browsing to collect data associated with the user's interests, hobbies, products of interests, purchased products, types of online stores the user visits, etc. The user analysis module 113 may cause the collected information associated with the user's web browsing to be stored in the database 120 and/or in a memory associated with the first user computing device 130a.

The user analysis module 113 may collect additional or other data associated with the user and her spending, interests, or hobbies. The additional data may also be stored in the database 120 and/or in a memory associated with the first user computing device 130a.

The user analysis module 113 may analyze, using a machine learning model, the collected data about the user's purchase history, web browsing, spending habits, payment habits, interests, hobbies, etc. to identify spending patterns, payment patterns, whether the user pays on time, whether the user pays partial or full amounts on credit card balances, types or categories of products that the user likes or prefers, average spending for various categories of products, particular merchants preferred by the user, locations of merchants, average distances the user travels to purchase items, whether the user prefers to shop online or in a brick-and-mortar store, whether the user prefers to shop when items are on sale or when a discount is provided for the product, etc.

The user analysis module 113 may use a machine learning model or a decision engine to assess or calculate the user's product proclivity, spending proclivity, and credit risk based on the analysis of the collected data. The user's product proclivity may be reflected as a score ranging, for example, from 0 to 100, and may indicate a likelihood, based on the analysis of the collected data, that the user would be inclined to purchase a particular product or category of product. A score of 100, for example, may indicate a high proclivity for purchasing the particular product or category of product, while a score of 0 might indicate a low proclivity for purchasing the product or category of product. The user's spending proclivity may be reflected as a score ranging, for example, from 0 to 100, and may indicate a likelihood, based on the analysis of the collected data, that the user would be inclined to spend a particular amount on a particular product or category of product, if the user were to purchase the product or category of product. A score of 100, for example, may indicate a high proclivity for spending a particular amount on the particular product or category of product, while a score of 0 might indicate a low proclivity for spending the particular amount on the product or category of product. The user's credit risk may be reflected as a score ranging, for example, from 0 to 100, and may indicate a credit risk or financial health associated with the user as determined from the analysis of the collected information and from other and additional credit and financial sources that the notification generation and authentication system 100 may access to receive information about the user, such as one or more third party sources. The user analysis module 113 may, in some cases, use the machine learning model or decision engine to assess or calculate additional scores, such as for assessing a likelihood that the user may accept an offer in a given store, at a given time, for a different price level, etc. The user analysis module 113 may generate and store, in the database 120 and/or in a memory associated with the first computing device 130a, information associated with various calculated scores. For instance, the user analysis module 113 may store information such as shown in the below Table 1 related to the user's product proclivity, spending proclivity, and/or credit risk.

TABLE 1

| Product/Product Category | Product Proclivity Score | Spending Proclivity - $10-$500 | Spending Proclivity - $501-$1000 | Spending Proclivity - $1001-$5000 | Credit Risk Score |
|---|---|---|---|---|---|
| Clothing | 60 | 80 | 40 | 20 | 87 |
| Electronics | 10 | 50 | 0 | 0 | |
| Travel | 80 | 100 | 100 | 90 | |
| Self-care | 95 | 100 | 100 | 100 | |
| Restaurants | 82 | 95 | 0 | 0 | |

The notification generation module 114 may use the various scores calculated by the user analysis module 113 to generate a ranked list of customized notifications for the user for particular products or categories of products. For instance, the notification generation module 114 may weight each of the scores to determine a product or service for which to generate the customized notification (e.g., a purchase offer), a type of customized notification (e.g., a type of offer) to generate, and a ranking of the generated notification. The notification may be related to specific products or a category of products. The notification may be related to offers for use with particular merchants in some cases and in other cases might not be associated with a particular merchant. The notification may be offers such as discounts, rebates, micro-credit offers (e.g., a reduced or promotional interest rate, no required minimum payments for a period of time, a credit limit increase, or the like), or other incentives to purchase the product or service. In some cases, the notification (e.g., the offer) may expire after a period of time. For example, using the scores shown in Table 1, the notification generation module 114 may generate a ranked list of various types of customized notifications, such as shown below in Table 2. The generated ranked list of customized notifications may be cached or stored in the database 120 or in a memory associated with the first user computing device 130a.

time. The number of notifications to present and/or the time for presenting the notifications may be determined based on user preference information specified during the system configuration process. In some cases, the number of notifications to present, the frequency of presenting notifications, and/or the time for presenting the notifications may be determined based on an analysis by a machine learning model of how the user has responded to notifications in the past. In some cases, the notifications presented to the user may be based on a location of the user. For instance, the notification selection module 115 may determine a location of the user based on a location of the first user computing device 130a. The location of the first user computing device 130a may be determined by one or more sensors of the first computing device 130a, such as a global positioning system (GPS) device. In some instances, the location of the first user computing device 130a may be determined using other methods, such as cellular or WI-FI triangulation. The location of the first user computing device 130a may be used to

TABLE 2

| Notification Identification No. | Rank | Product | Notification |
|---|---|---|---|
| 2476 | 1 | Brand A body lotion | Buy one get one free of Brand A body lotion |
| 2477 | 2 | Facial | 10% off cost of facial at merchant of choice |
| 2478 | 3 | Toothpaste B | You like Toothpaste A, check out Toothpaste B - it's down the aisle and is cheaper than Toothpaste A today. |
| 2479 | 4 | Brand B exercise bike | Increase credit limit for purchase of Brand B exercise bike |
| 2480 | 5 | Cruise Line C cruise tickets | $200 rebate on purchase of cruise ticket on Cruise Line C |
| 2481 | 6 | Winter coat from Merchant A | 20% off any winter coat at Merchant A |
| 2482 | 7 | TV | No interest for 12 months for purchase of any brand TV |

The notification generation module 114 may additionally generate, for each of the customized notification, a unique security key to be associated with the offer included in the notification. The security key may be used to ensure that only the user for whom the notification was generated may accept and redeem the included offer. The security key may be implemented as a hyperlink, a quick response (QR) code, a bar code, etc. and may be embedded with information identifying the offer or the notification, such as the notification identification number. The security key may be used when presenting the offer to the user. For instance, the security key may be included in the notification transmitted to the user regarding the offer, and the user may be able to select or scan, using a bar code or QR code reader application, the security key to redeem the offer. Selection or scanning of the security key may cause execution of a script which may capture the identification information associated with the security key so that the proper offer may be redeemed and so that the offer may only be redeemed by the proper recipient.

The notification selection module 115 may be used by the server 110 to determine which notifications from the ranked list of customized notifications generated by the notification generation module 114 to present to the user. In some cases, only a subset of the generated customized notifications may be selected to present to the user. In some cases, some notifications may be presented to the user at a first time and other notifications may be presented to the user at a second determine one or more landmarks in proximity to the first user computing device 130a. The landmarks may be merchants, vendors, stores, an aisle in a store, etc. at which products or services are offered for sale. The notification selection module 115 may query a database, such as the database 120, to determine landmarks and their corresponding locations. The notification selection module 115 may further determine or narrow down the one or more landmarks based on determining that the first user computing device 130a is located with a predetermined distance from the landmark.

The predetermined distance may be based on user preference information specified during the system configuration process or may be based on an analysis by a machine learning model of how far the user is likely to travel to make a purchase. In some cases, the predefined distance may be a distance such that the user is located inside the landmark, such as inside a merchant store or in the shopping complex housing a merchant store, or in a particular aisle of a merchant store.

The notification selection module 115 may identify a website associated with each of the determined one or more landmarks within the predetermined distance of the first user computing device 130a. The website may be maintained by the merchant computing device 140 for example. The notification selection module 115 may analyze the website to identify one or more products or services offered by that landmark. The notification selection module 115 may use web scraping techniques to obtain the products and services. For instance, the notification selection module 115 may use one or more scripts configured to identify certain words on the web page, such as "product" "item," "purchase," "sale," or the like and extract corresponding information. In some instances, the script may be configured to access links on the web page to obtain the necessary information. The notification selection module 115 may further use a machine learning model to identify the products or services and corresponding information on the website. In some cases, the notification selection module 115 may request and receive product information from a computing device associated with the landmark, such as the merchant computing device 140. The notification selection module 115 may additionally retrieve information about a stock level of the product at the landmark. The notification selection module 115 may compare the ranked list of customized notifications with the identified products and/or services offered at the landmarks within the predetermined distance of the first user computing device 130a to select one or more notifications to present to the user. Accordingly, the selection of the one or more notifications may be made in real-time while the user is within the predetermined distance, such as while the user is shopping at the landmark. In some cases, the real-time selection of the one or more notifications may further be based on the current stock level of the product at identified landmark. For instance, only notifications for products with a current stock level, at an identified landmark, above a certain threshold may be selected.

In some cases, a determination about the location of the user and a determination about locations of the landmarks (and their associated websites) in proximity to the user may be made prior to the analysis of the collected data and the generation of the ranked list of customized notifications. In this case, the ranked list of customized notifications may be generated based on the location of the user and the user's predetermined distance from the one or more landmarks, such that the notifications may be generated in real-time while the user is within proximity to the one or more landmarks, such as while the user is shopping at the landmark. For instance, the user analysis module 113 may analyze collected data about the user's purchase history, web browsing, spending habits, hobbies, interests, etc. and the notification generation module 114 may generate the customized notifications after detecting that the user is shopping at a particular landmark. The notification generation module 114 may identify products offered at the particular landmark that may be of interest to the user based on the user analysis. The notification generation module 114 may generate the notifications in real-time and the notification selection module 115 may determine which notifications to present to the user based on, a stock level of a product at the landmark, a ranking of the generated notification, user preference information, seasonal considerations, an analysis by a machine learning model regarding which notifications should be presented, which notifications the user would likely be responsive to, or the like. In some cases analysis of the collected data and/or generation of the customized notifications may occur both before and after the location of the user is determined.

Figure 4C:
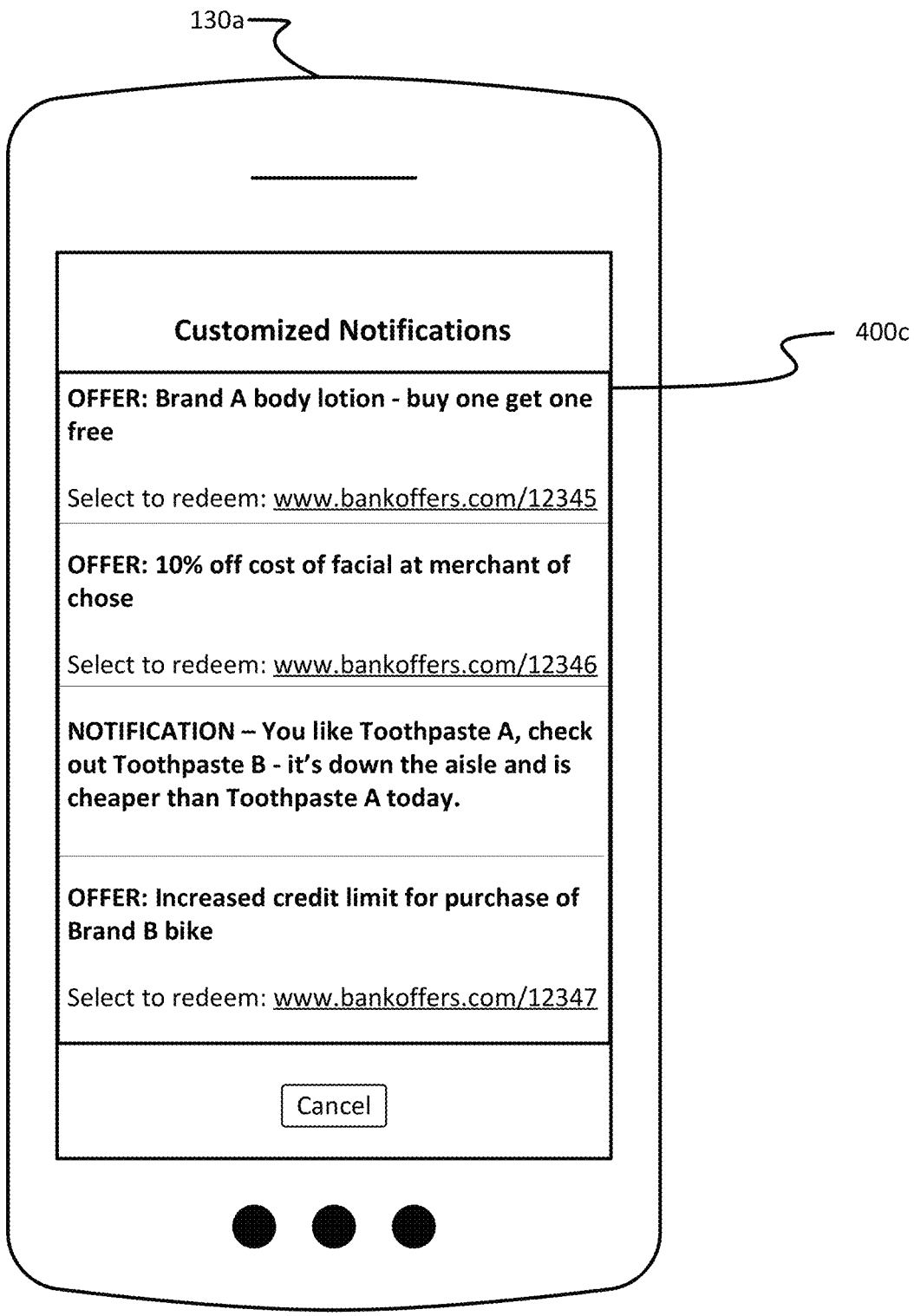
Figure 4D:
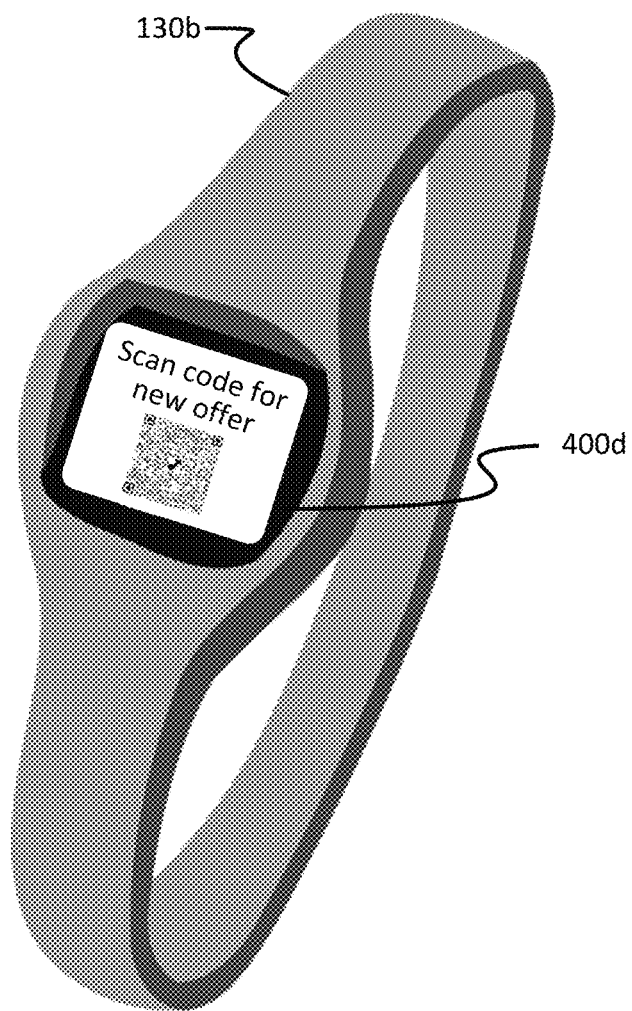
Figure 4E:
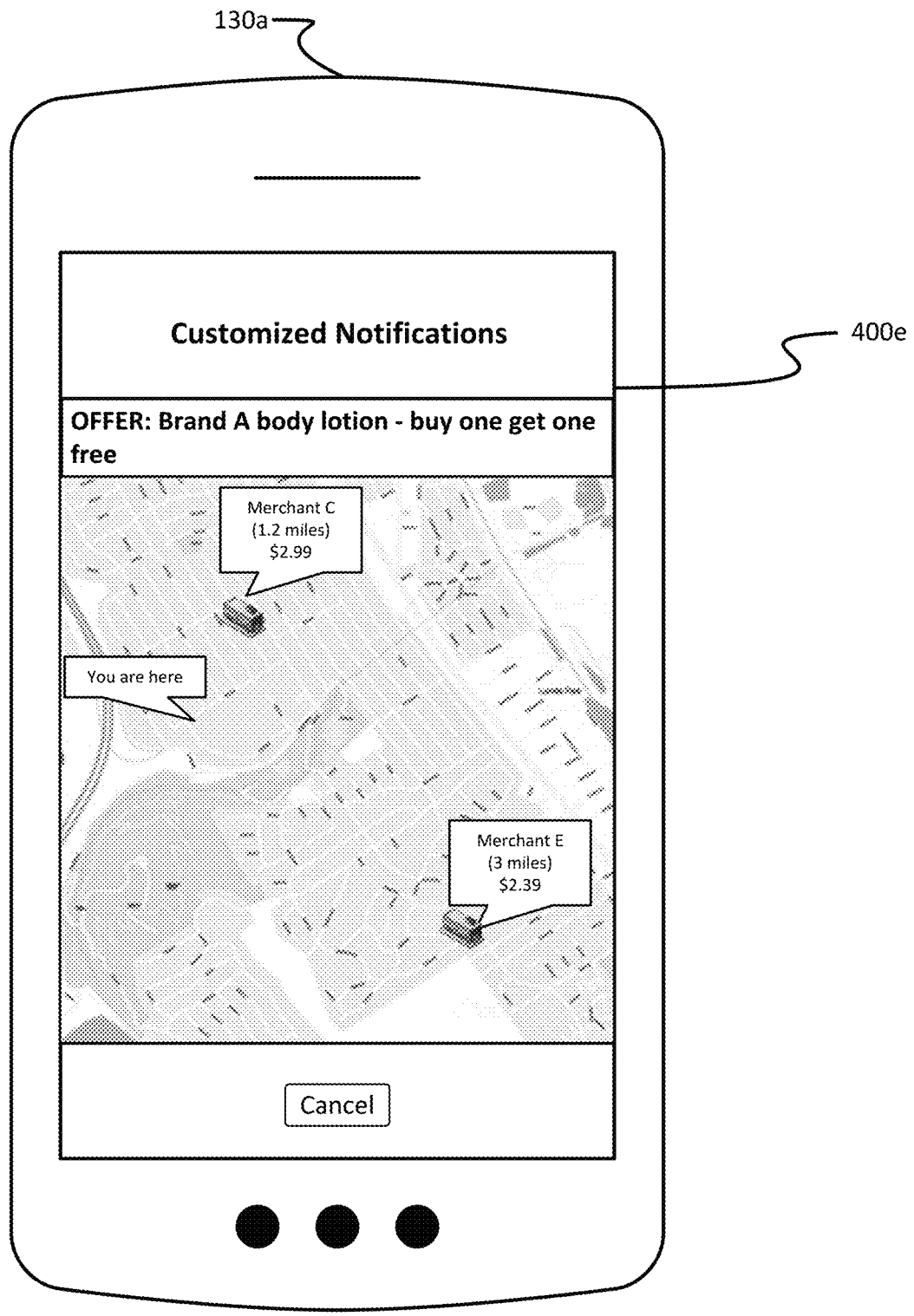

The notification selection module 115 may output one or more notifications via the banking application 111, such as shown in a user interfaces 400c and/or 400d in FIGS. 4C and 4D, while the user is within the predefined distance of the one or more landmark. For instance, the notification selection module 115 may output the one or more notifications while the user is shopping at a merchant store. In some cases, the notifications may additionally or alternatively be transmitted to one or more of the user computing devices 130 as a text message. In some cases the notifications may additionally or alternatively be emailed to the user.

The notification may include information about one or more offers, an advertisement, a warning, a recommendation, information about the availability of a product in proximity to the user, etc. For instance, the notification may include a targeted advertisement or information about product that the user may be in proximity to and that may be of interest to the user. In some cases, the notification may identify a product or service and details about an offer, such as shown in user interface 400c. The notification may additionally or alternatively include the unique security key generated for the offer, which may be selected or scanned by the user to indicate that the user wishes to accept and redeem the offer to purchase the corresponding product or service, such as shown in user interfaces 400c and 400d. If the user does not select or scan the security key within a predefined period of time, the offer may expire. In some cases, before to predefined period of time, the notification selection module 115 may output a reminder notification via the banking application 111, or may transmit a reminder notification to one or more of the user computing devices 130, reminding the user of the offer. After the predefined time, the notification selection module 115 may further output a notification, via the banking application 111 or may transmit a reminder notification to one or more of the user computing devices 130, notifying that the offer has been canceled. In this case, the notification selection module 115 may cause the offer to be invalidated so that it might not be redeemable after the predefined period of time.

The authentication module 116 may be used by the server 110 to authenticate redemption of an offer included in a customized notification. The authentication module 116 may be used to confirm that an offer is redeemed only by the user for whom the notification was generated. When the security key included in the notification of an offer is selected or scanned, the authentication module 116 may execute a script that may cause identification information of the notification, such as the notification identification number, and identification information, such as a MAC address or a telephone number or the like, of the device from which the offer (e.g., the security key) was selected or scanned to be transmitted to the server 110. The authentication module 116 may query the database 120 using the identification information of the notification to identify the user for whom the notification was generated. The authentication module 116 may further query the database 120 to determine stored identification information associated with one or more devices registered by the user to be used with the notification generation and authentication system 100. For instance, during the system configuration process the user may have registered the first user computing device 103a, the second user computing device 130b, and the third user computing device 130c for use with the notification generation and authentication system 100. The authentication module 116 may compare the stored identification information associated with the user's registered devices with the received identification information of the device from which the offer was selected or scanned. If the received identification information of the device from which the offer was selected or scanned matches identification information for one of the user's registered devices, the redemption of the offer may be authenticated. In some instances, the authentication module 116 may require additional or different forms of authentication. For instance, the authentication module 116 may require a password to be entered, a fingerprint scan, facial scan, an iris scan, or the like.

In some instances, upon selection or scanning of the of the security key, the script executed by the authentication module 116 may additionally cause one or more operating parameters of the device from which the security key was selected or scanned to be transmitted to the server 110. The authentication module 116 may analyze the one or more operating parameters to determine a likelihood that the GPS location of the device is being spoofed. For instance, the authentication module 116 may analyze the one or more operating parameters to determine whether certain applications known to perform location spoofing are operating on the device. The operating parameters may additionally or alternatively include an IP address associated with the device and the authentication module 116 may compare a location associated with the IP address with the GPS location of the device. The authentication module 116 may additionally compare the IP address with known virtual private network (VPN) IP addresses. If the authentication module 116 determines that it is likely that the GPS location is being spoofed, the authentication module 116 may transmit a notification to the device indicating that certain applications or VPN services on the device must be disabled prior to attempting to redeem the offer. After disabling the certain applications or VPN services, the user may be provided an opportunity to attempt to redeem the offer one or more times. After a threshold amount of attempts, if the authentication module 116 determines that it remains likely that the GPS location of the device is being spoofed, the authentication module 116 may determine that authentication is unsuccessful.

If authentication is unsuccessful, the authentication module 116 may transmit a notification, via the banking application 111, notifying the user that authentication was unsuccessful and that the offer might not be redeemed.

If authentication is successful, the authentication module 116 may output a notification, via the banking application 111, notifying the user that authentication was successful and that the user may purchase the product or service and that upon proof of purchase, the offer will be applied to an account associated with the user. In some cases, the authentication module 116 may output a user interface providing information on landmarks or merchants where the offer may be redeemed. For instance, the authentication module 116 may output a user interface via the banking application 111 displaying a list of landmarks and corresponding locations or a map displaying locations of the landmarks or merchants, such as shown in user interface 400e in FIG. 4G. The user may select one of the displayed landmarks or merchants, and the authentication module 116 may provide route guidance from the current location of user, such as the location of the first user computing device 130a, to the selected landmark/merchant.

Figure 4G:
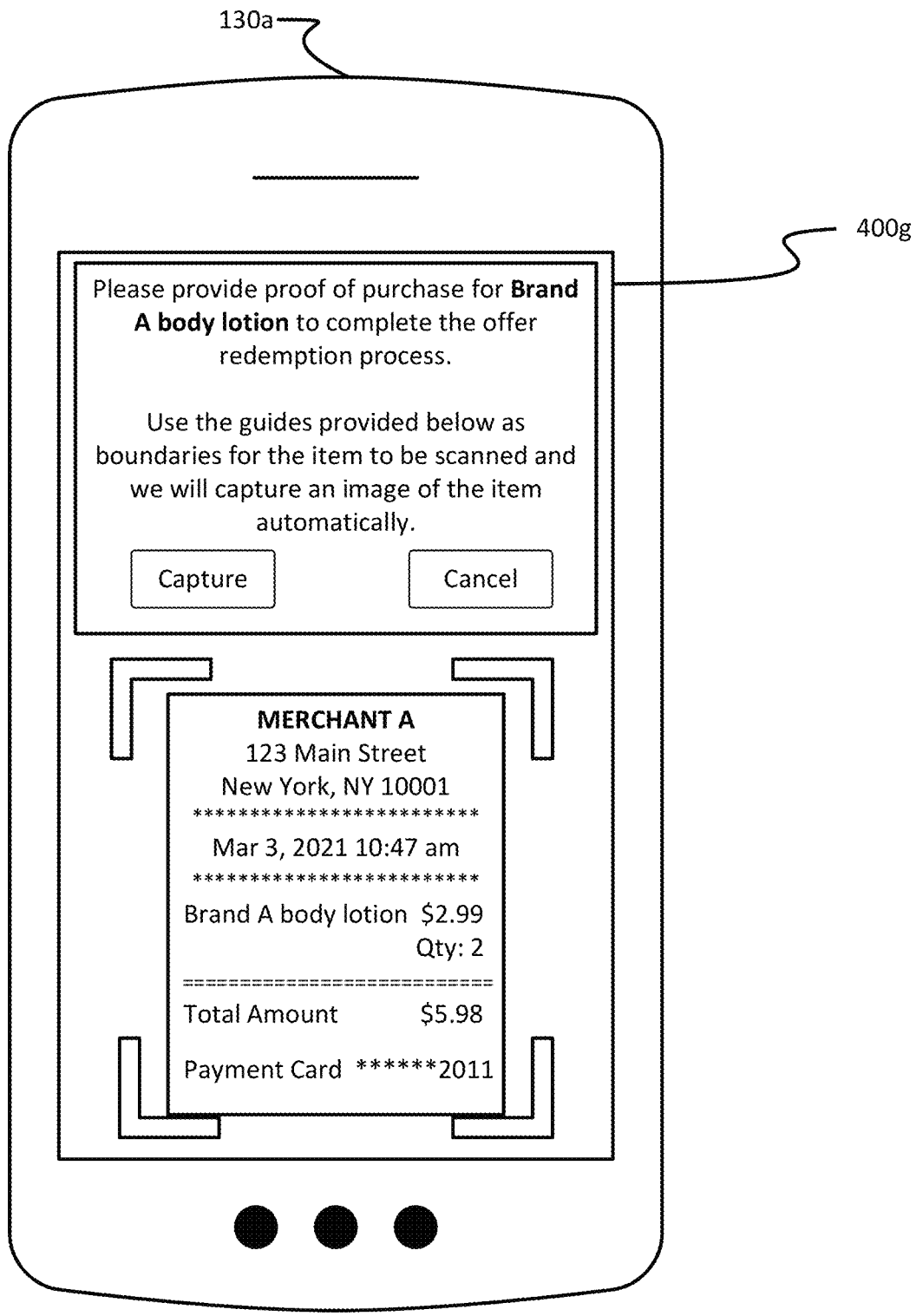

The authentication module 116 may further provide instructions for providing proof of purchase. For instance, the user may be instructed to upload an image of a purchase receipt, via a user interface of the banking application 111, such as user interface 400g in FIG. 4G, showing that the product or service associated with the redeemed offer was actually purchased. A user interface may be provided via the banking application 111 for uploading the purchase receipt and the receipt may be analyzed using one or more of the techniques previously described to convert the image to text and to analyze the receipt text to determine the purchase details included therein. Upon successfully determining that the purchase details provided on the receipt correspond to the product or service associated with the redeemed offer, for example, whether the product was purchased after redemption of the offer, proof of purchase may be confirmed.

In some cases, the authentication module 116 may instruct the user to scan a bar code, QR code, or the like located on a packaging or a tag attached to the product when the user is at home. The user may be provided with a threshold amount of time by which the product must be scanned. The banking application 111 may provide a user interface for performing the scan, such as user interface 400g. Upon scanning the bar code or QR code associated with the product, the authentication module 116 may receive the identification information associated with the bar code/QR code and compare the received identification information with identification information for the product associated with the redeemed offer. The authentication module 116 may additionally capture the GPS location of the device that performed the scan at the time of the scanning to ensure that the user is not still located at the merchant store where the item was to be purchased. The authentication module 116 may also compare a time of redemption of the offer with a time of the scanning of the packaging or tag of the product. The authentication module 116 may additionally make another determination, based on receiving one or more operating parameters of the device, of whether a GPS location of the device is likely spoofed. If the authentication module 116 determines that the location of the device is likely spoofed, the proof of purchase might not be accepted and the authentication module 116 may determine that authentication is unsuccessful.

The offer processing module 117 may be used by the server 110 to process a successfully redeemed offer. For instance, after determining that the offer was redeemed by a registered device, that the GPS location of the device from which the offer was redeemed was likely not spoofed, and/or after proof of purchase is received and accepted, the offer processing module 117 may apply the offer to an account, such as a bank account or a credit card account associated with the user. Applying the offer to the user's account may mean that the user's account may be credited with a monetary amount associated with the value of the offer or that credit terms associated with the user's account may be adjusted or the like. For instance, if the user redeemed the 10% off of a facial offer and the user paid $100 for the facial, the offer processing module 117 may apply a $10 credit to the user's bank account. The credit may be applied after the proof of purchase is received at the server 110. In another example, if the user redeemed the no interest for 12 months for purchase of any brand of TV, upon proof of purchase of the TV, the offer may be applied to the user's credit card account such that no interest will accrue for the cost of the TV for 12 months from the date of purchase. The offer processing module 117 may further output a notification, via the banking application 111, or transmit a notification to the one or more user computing devices 130, notifying the user that the offer was successfully processed. After the offer is successfully redeemed or processed, the offer processing module 117 may invalidate the offer so that the offer might not be used again.

The machine learning training module 118 may be used by the server 110 to train one or more machine learning models and/or algorithms used for generating the customized notifications. The server 110 may use various machine learning models and/or algorithms, such as, but not limited to, supervised learning algorithms, unsupervised learning algorithms, regression algorithms (e.g., linear regression, logistic regression, etc.), instance based algorithms (e.g., learning vector quantization, locally weighted learning, etc.), regularization algorithms (e.g., ridge regression, least-angle regression, etc.), decision tree algorithms, Bayesian algorithms, clustering algorithms, artificial neural network algorithms, classification algorithms, ranking algorithms, etc.

The machine learning models may be trained using one or more training datasets generated by the machine learning training module 118. The training datasets may include labeled data. For example, the machine learning training module 118 may generate a dataset in which information about a notification presented to a user is labeled with whether or not the user was responsive to the notification. The machine learning training module 118 may input the training dataset into the machine learning model to train the model to make predications related to whether a user may be responsive to a notification.

For instance, if the user receives notification of an offer and decides to redeem the offer, after the offer has been successfully processed by the offer processing module 117, the machine learning training module 118 may generate a training dataset that includes information and/or conditions associated with the redeemed offer and that is labeled as 'redeemed.' The information and/or conditions associated with the redeemed offer that may be included in the training dataset may comprise the product/service associated with the offer, the landmark or merchant from whom the product/service was purchased, a date and time of transmission of the notification of the offer, a date and time of selection or scanning of the security key provided in the offer, a date and time of the purchase transaction associated with the offer, a value associated with the offer, a type of the offer, a price of the product/service at the time of purchase, a distance between the location of the first user computing device 130*a* and the location of the landmark or merchant from whom the product/service was purchased when notification of the offer was generated, a distance between the location of the first user computing device 130*a* and the location of the landmark or merchant when the selection or scanning of the security key was received, a number of notifications presented to the user since any prior offer redeemed by the user, the weather at a location of the of the first user computing device 130*a* when the notification was transmitted, and/or the like.

Additionally, in the case where the user receives notification of an offer and decides not to redeem the offer, the machine learning training module 118 may generate a training dataset that includes information and/or conditions associated with the unredeemed and that is labeled as 'not redeemed.' The machine learning training module 118 may determine that the user decides not to redeem the offer if the selection or scanning of the security key is not received within a predefined period of time. The information and/or conditions associated with the unredeemed offer that may be included in the training dataset may comprise the product/service associated with the offer, the landmark or merchant offering the product/service associated with the offer for sale, a date and time of transmission of the notification of the offer, a value associated with the offer, a type of the offer, a price of the product/service associated with the offer at the time of notification of the offer, a distance between the location of the first user computing device 130*a* and the location of the landmark or merchant offering the product/service associated with the offer for sale, a number of notifications presented to the user since any prior offer redeemed by the user, the weather at a location of the of the first user computing device 130*a* when the notification was transmitted, and/or the like.

In some cases, the notification might not be for an offer, and may instead be a recommendation, a warning, an advertisement, or the like and the user may only be expected to read or otherwise engage with the notification without having an offer to redeem. In this case, the corresponding generated training dataset may be labeled 'responsive' or 'not responsive,' rather than 'redeemed' or 'not redeemed,' based on whether the user has read or otherwise engaged with the notification.

The machine learning training module 118 may input the training dataset into the machine learning model to train the model to make predications related to whether a notification of an offer is likely to be redeemed or responded to by the user.

The machine learning models may utilize the training datasets to identify patterns, sequences, and/or relationships in the training data sets, so as to train the models to make predictions about potential new notifications to be presented to the user based on information and conditions associated with those potential new notifications. In this way, the machine learning models may be trained and be able to make predictions about the types of notifications that the user is likely to redeem or respond to. The machine learning models may receive as input, information and conditions associated with potential new notifications, and may output tags indicating whether each of the potential new notifications are likely to be redeemed and/or responded to. For instance, during the process of generating a new notification by the notification generation module 114, the notification generation module 114 may input an unlabeled dataset into the machine learning model comprising information and/or conditions associated with the potential new notification. The information and/or conditions may comprise, for example, a product/service to be associated with the offer, a landmark or merchant offering the product/service for sale, a current date and time, a value associated with the offer, a type of the offer, a price of the product/service associated with the offer, a current distance between the location of the first user computing device 130*a* and the location of the landmark or merchant offering the product/service for sale, a number of notifications presented to the user since any prior offer redeemed by the user, the current weather at a location of the of the first user computing device 130*a*, and/or the like. The machine learning model may receive the information and/or conditions associated with the potential new notification and may output a prediction of whether the potential new notification is likely to be redeemed or responded to by the user. In some instances, the machine learning model may further output a confidence score or level associated with the prediction, which may indicate a degree of confidence in the predication. The confidence score may be a numeric value or may be an indication such as high, medium, low, etc. or may be represented in a different way. The notification generation module 114 may determine whether or not to generate the new notification based on the prediction and/or the confidence score output by the machine learning model.

The machine learning training module 118 may generate additional training datasets for use in training the machine learning models. For example, the machine learning training module 118 may generate a training dataset comprising labeled images for input into the machine learning model to train the model to recognize, in the images, certain objects that may be useful in determining a user's interest and/or hobbies. For instance the training dataset may include images labeled as 'shoes,' 'boat,' 'car,' 'dog,' 'purse,' etc. The training dataset, comprising the labeled images and provided as input to the machine learning model, may be used by the model to analyze other unlabeled images input into the model in order to identify objects or products in those images, and the model may output the identified objects/products associated with the unlabeled images. For instance, the machine learning model may receive as input, social media posted images associated with the user, and may output a tag indicating one or more objects identified in the social media posted image. The output may additionally include a confidence score or level associated with the identification of the object, which may indicate a degree of confidence that the object was accurately identified. The machine learning training module 118 may use this output, e.g., the identified object and/or the confidence score, along with other information, such as the frequency and/or number of images of the identified object being posted by the user to determine whether the identified object represents an interest of the user. For example, if the user posts images determined by the machine learning model to include 'shoes' more than a threshold number of times and/or at a rate of frequency greater than a threshold frequency, the machine learning training module 118 may determine shoes are of particular interest to the user.

The machine learning training module 118 may generate other training datasets to input to the machine learning models to train the models to make other predictions or to recognize other data for use in generating the customized notifications. For example, the machine learning models may be trained with a training dataset of labeled purchase receipt/invoice images and/or receipt/invoice layouts to train the model to recognize and extract various elements of an unlabeled purchase receipt/invoice input into the model, such as line item purchase details. The machine learning models may additionally be trained with a training dataset of labeled social media data to train the model to recognize language that may be indicative of purchases made, spending habits, hobbies, and/or interests of a user. The machine learning models may additionally be trained with a training dataset of labeled purchase history data to train the model to recognize or make predictions about various items, such as spending patterns, payment patterns, whether the user pays bills in a timely manner, types or categories of products that the user prefers, average spending amounts for various categories of products, merchants preferred by the user, a maximum distance the user is willing to travel to purchase items, whether the user prefers to shop online or in brick-and-mortar stores. The machine learning models may additionally be trained with one or more training datasets used to train the models to make predictions related to whether the user prefers to shop when items are on sale or when a discount is provided for the product, an optimal number of notifications to present to the user, an optimal frequency of presenting notification to the user, an optimal time for presenting the notifications to the user, and/or the like. The machine learning models may additionally be trained with training datasets of merchant websites to train the models to analyze merchant websites to recognize products or services offered for sale and corresponding information about the products or services.

The database 120 may store information used by the server 110, the banking application 111, the system configuration module 112, the user analysis module 113, the notification generation module 114, the notification selection module 115, the authentication module 116, the offer processing module 117, and/or the machine learning training module 118. The database 120 may comprise one or more of a relational database, a hierarchical database, a distributed database, an in-memory database, a flat file database, an XML database, a NoSQL database, a graph database, or the like.

The one or more user computing devices 130, e.g., first user computing device 130a and/or the second user computing device 130b, may be configured to communicate with and/or connect to one or more computing devices of the computing environment 100 via the public network 160. In some instances, the one or more user computing devices 130 may have installed thereon one or more applications for performing one or more aspects described herein. For instance, the first user computing device 130a and/or the second user computing device 130b may store an application, such as the banking application 111, for accessing a bank account, credit card account, commercial account, line of credit, or the like, or may store a web browsing extension used to track web browsing. In some instances, the one or more user computing devices 130 may access one or more applications installed on the server 110 for performing one or more aspects described herein. For instance, the third user computing device 130b, may access, using a website, and via the public network 160, the banking application 111 installed at the server 110.

The one or more user computing devices 130 may be any type of computing device or combination of devices capable of performing the particular functions disclosed herein. For example, the one or more user computing devices 130 may be and/or include server computers, desktop computers, laptop computers, tablet computers, smart phones, fitness devices, or the like that may include one or more processors, memories, communication interfaces, storage devices, and/or other components. The one or more user computing devices 130, in some instances, may be or include special-purpose computing devices configured to perform the functions disclosed herein. In some instances, some or all of the functionality of the server 110 may instead be performed by any of the one or more user computing devices 130 alone or in combination with the server 110.

The one or more user computing devices 130 may have integrated therein an image capturing device for capturing an image or scanning a code, such as a bar code or a QR code. For instance, the image capturing device may be one of one or more sensors of the one or more user computing devices 130, and one or more applications installed on the one or more user computing devices 130 may cause the image capturing device to be activated and to capture an image or scan a code. The captured image may be stored on the one or more user computing devices 130 and/or on a different device. In some cases, the image capturing device may be used to capture one or more images of a receipt for use in extracting line item data for a corresponding transaction. In some cases, the image capturing device may be used to scan a barcode, QR code, or the like associated with a generated notification, such as provided via a security key, or associated with a purchased product, such as provided on a tag or packaging of the purchased product. In some cases, the one or more user computing devices 130 may use an image capturing device that is separately embodied from the one or more user computing devices 130. When separately embodied, the image capturing device may, in some cases, be communicatively connected to the one or more user computing devices 130 and may be controlled by the one or more user computing devices 130. In some instances, the image capturing device, might not be connected to the one or more user computing devices 130. In some instances, the image capturing device may be communicatively connected to the public network 160 and may be configured to transmit images to the one or more user computing devices 130, the server 110, and/or to other devices via the public network 160.

The merchant computing device 140 may comprise a computing device associated with a merchant or landmark external to the organization or business, e.g., as a financial institution, that operates the private network 170. The merchant computing device 140 may be used by the merchant when a user makes a purchase using a credit or other payment card. When the user's card is swiped by the merchant during the purchase transaction, the merchant computing device 150 may receive approval for the purchase transaction from a payment processor system associated with the payment card. The merchant computing device 150 may maintain certain information associated with the purchase transaction, such as a transaction identifier, a purchase date and time, a purchase amount, and/or a payment card information. In some instances, more detailed information about the purchase may be maintained by the merchant, such as the individual items that were purchased during transaction. For instance, the merchant computing device 140 may store information for each purchased item in a transaction, such as an item identifier and/or name, a quantity of the item purchased, and/or an item purchase price. In some instances, the merchant computing device 140 may provide such information to a computing device associated with the financial institution issuing the payment card. For instance, the merchant computing device 140 may communicate, via the public network 160, with the private network 170, and the server 110 and may send transaction information to the server 110 automatically after each purchase transaction or upon request by the server 110. The merchant computing device 140 may also maintain product and/or service information related to products and/or services offered for sale by the merchant and, upon request, may send product information to the sever 110. The product information may include a product name, description, price, a stock level, or the like of particular products/services offered by the merchant. The merchant computing device 140 may additionally maintain a website used by the general public for online shopping. The website may additionally include information about the various products and/or services offered by the merchant.

The public network 160 may connect the private network 170, and/or the one or more computing devices connected thereto, to one or more networks, systems, and/or computing devices that might not be associated with the organization, such as the one or more user computing devices 130 and the merchant computing device 150. The public network 160 may include one or more networks, such as the Internet.

The private network 170 may be a network operated by, and internal to, an organization or business, such as a banking institution. The private network 170 may be used to interconnect one or more computing devices internal to the organization or business. The private network 170 may further connect to the public network 160. The private network 170 may include one or more of local area networks (LANs), wide area networks (WANs), virtual private networks (VPNs), or the like.

Figure 2:
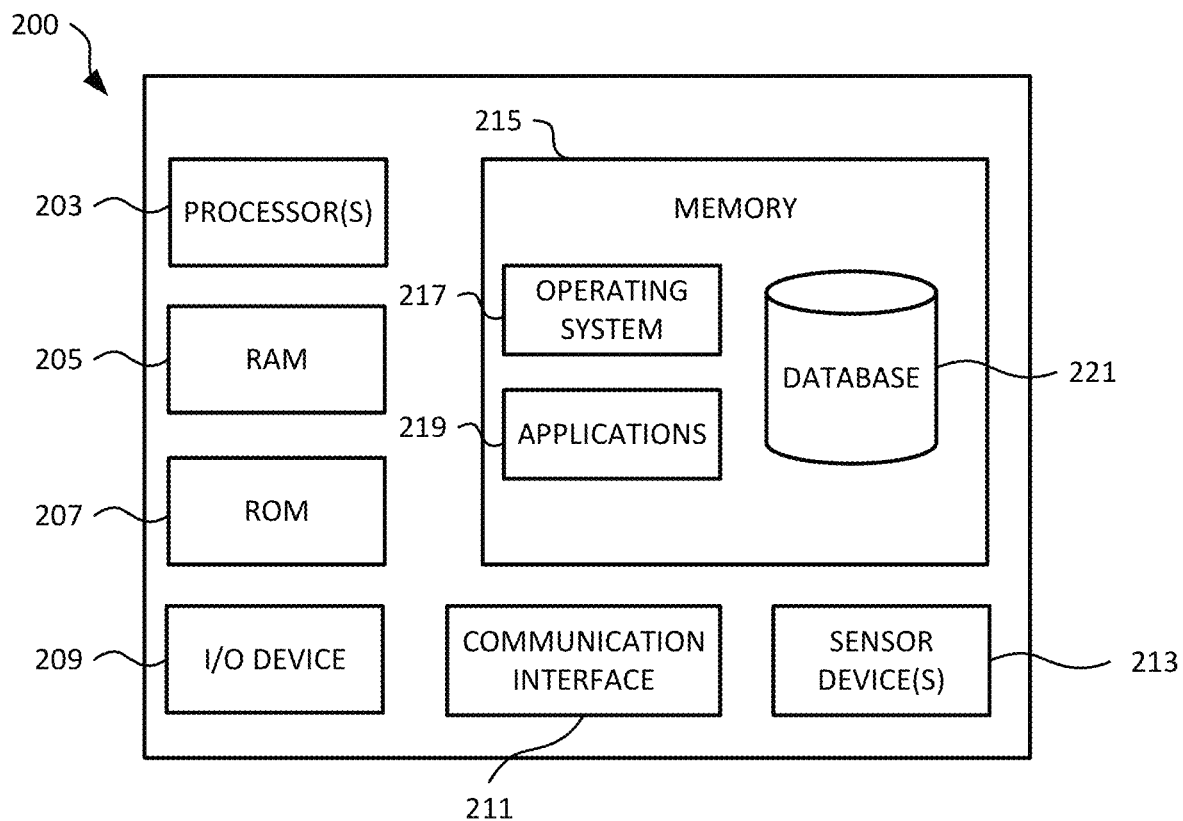
FIG. 2 illustrates an example computing device for use in a notification generation and authentication system, in accordance with one or more aspects described herein.

Referring to FIG. 2, an example computing device 200 is provided. The example computing device 200 may include or incorporate any one of the server 110, the database 120, the one or more user computing devices 130, or the merchant computing device 140. In some instances, the computing device 200 may represent, be incorporated in, and/or include various devices such as a desktop computer, a computer server, a mobile device, such as a laptop computer, a tablet computer, a smart phone, or any other types of mobile computing devices, and/or any other type of data processing device.

The computing device 200 may include one or more components, such as one or more processors 203, a random access memory (RAM) 205, a read-only memory (ROM) 207, an input/output (I/O) device 209, a communication interface 211, one or more sensor devices 213, and a memory 215. The computing device 200 may include one or more additional or different components.

The one or more processors 203 may be configured to control overall operation of the computing device 200 and its associated components. A data bus (not shown) may interconnect the one or more processors 203, the RAM 205, the ROM 207, the memory 215, the I/O device 209, the communication interface 211, and/or the one or more sensor devices 211. The one or more processors 203 may include a single central processing unit (CPU), which may be a single-core or multi-core processor, or may include multiple CPUs. The one or more processors 203 and associated components may control the computing device 200 to execute a series of computer-readable instructions to perform some or all of the processes disclosed herein. Although not shown in FIG. 2, various elements within the memory 215 or other components in the computing device 200, may include one or more caches, for example, CPU caches used by the one or more processors 203, page caches used by operating system 217, disk caches of a hard drive, and/or database caches used to cache content from database 221. For embodiments including a CPU cache, the CPU cache may be used by the one or more processors 203 to reduce memory latency and access time. The one or more processors 203 may retrieve data from or write data to the CPU cache rather than reading/writing to the memory 215, which may improve the speed of these operations. In some examples, a database cache may be created in which certain data from the database 221 may be cached in a separate smaller database in a memory separate from the database 221, such as in the RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

The I/O device 209 may include, but need not be limited to, a microphone, keypad, touch screen, and/or stylus, through which a user of the computing device 200 may provide input, and may also include one or more of a speaker for providing audio output, and a video display device for providing textual, audiovisual, and/or graphical output.

The communication interface 211 may include one or more transceivers, digital signal processors, and/or additional circuitry and software for communicating via a network (e.g., the public network 160, the private network 170, or the like), wired or wireless, using any protocol as described herein.

The one or more sensor devices 213 may include one or more of an accelerometer, a gyroscope, a GPS device, a biometric sensor, a proximity sensor, image capturing device, a magnetometer, etc.

The memory 215 may store software to provide instructions to the one or more processors 203 allowing the computing device 200 to perform various actions. For example, the memory 215 may store software used by the computing device 200, such as the operating system 217, applications 219, and/or the database 221. The various hardware memory units in the memory 215 may include volatile and nonvolatile, removable and non-removable media implemented in any method or technology for storage of information, such as computer-readable instructions, data structures, program modules, or other data. The memory 215 may include one or more physical persistent memory devices and/or one or more non-persistent memory devices. The memory 215 may include, but need not be limited to, the RAM 205, the ROM 207, electronically erasable programmable read only memory (EEPROM), flash memory, or other memory technology, optical disk storage, magnetic cassettes, magnetic tape, magnetic disk storage or other magnetic storage devices, or any other medium that may be used to store the desired information and that may be accessed by the one or more processors 203.

Although various components of the computing device 200 are described separately, functionality of the various components may be combined and/or performed by a single component and/or multiple computing devices in communication without departing from the disclosure.

Figure 3A:
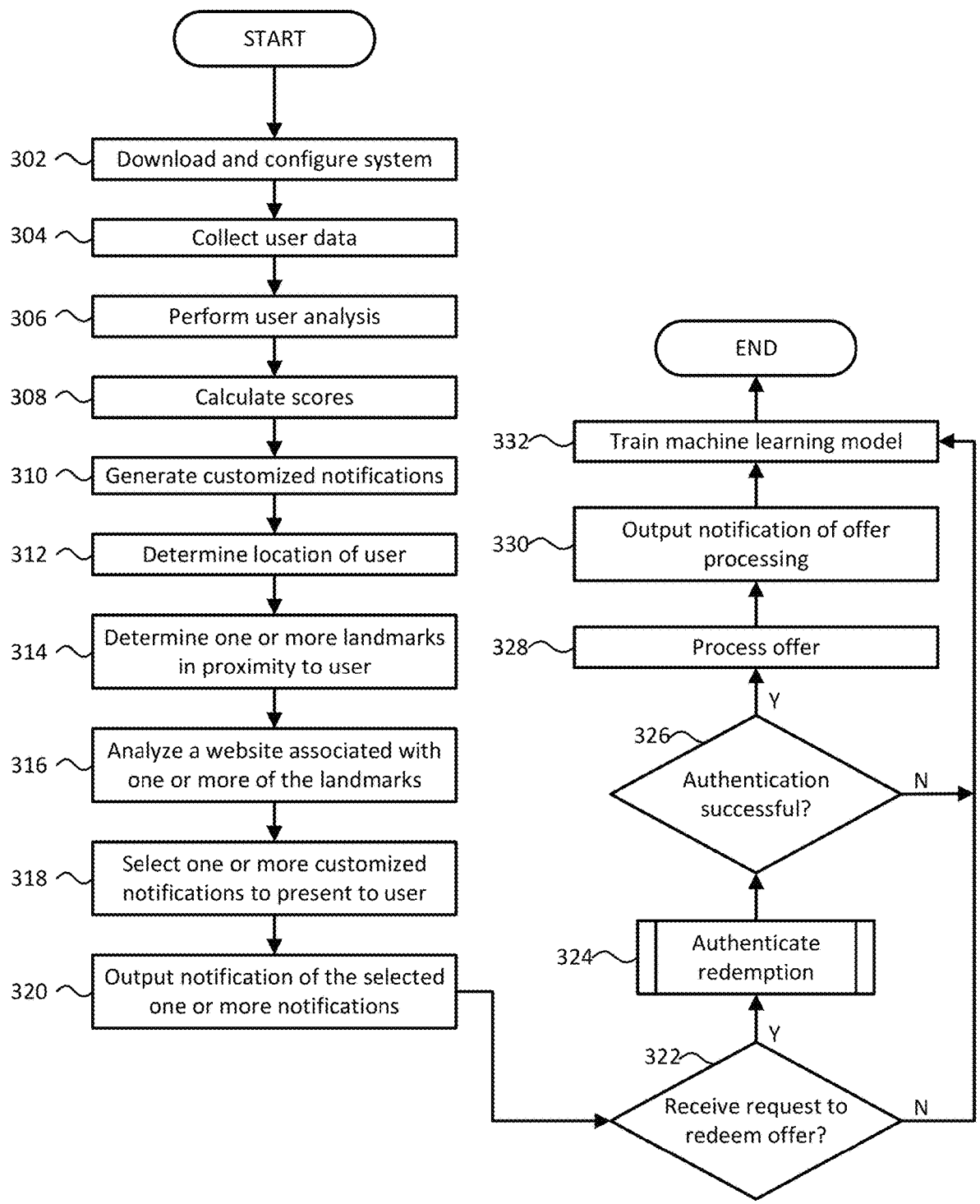
FIGS. 3A-3B are flowcharts of example methods of a notification generation and authentication system, in accordance with one or more aspects described herein.

FIG. 3A discloses an example method of an offer generation process in the notification generation and authentication system 100, in accordance with one or more aspects described herein. The example methods are described as being performed by the server 110, however the example methods may be performed by any one of the server 110, the one or more user computing devices 130, the computing device 200, and/or a combination thereof. FIGS. 4A-4G are example user interfaces of a banking application, such as banking application 111, used by the example methods.

Referring to FIG. 3A, at step 302, the server 110 may receive a request to download an application and perform a system configuration in association with the notification generation and authentication system 100. For instance, the server 110 may receive a request from the first user computing device 130a to download the banking application 111 and/or a web browser extension. The server 110 may utilize the system configuration module 112 to download the banking application 111 and/or the web browser extension to the first user computing device 130a. Once downloaded, the user may be prompted via one or more user interfaces, such as user interfaces 400a and 400b shown in FIGS. 4A and 4B, to configure the system by providing information identifying: one or more bank accounts, credit card accounts, or the like that should be used with the notification generation and authentication system 100 to collect the user's purchase history and monitor the user's spending and payment habits; social media accounts that may be monitored to collect data associated with the user's spending habits, hobbies, and/or interests; one or more email accounts associated with the consumer to be scanned or monitored for purchase receipts or invoices; social media accounts of friends to participate in a network of friends associated with the notification generation and authentication system 100; user preferences, such as preferred merchants, spending limits, a maximum distance willing to travel to purchase a product or service, hobbies, interests, demographic information (i.e., an age range, number and ages of children, household income range, etc.), a time for presenting notifications, a maximum number of notifications to present at a time, types of notifications that should not be presented to the user, etc.; and/or one or more devices to register for use with the notification generation and authentication system 100. The system configuration information may be stored in the database 120 and/or in a memory associated with the first user computing device 130a.

After the system has been configured, at step 304, the server 110 may utilize the user analysis module 113 to perform data collection. The user analysis module 113 may collect data for making determinations about customized notifications to generate for the user. The user analysis module 113, may use the information provided during system configuration, to access and monitor the user's bank accounts, credit card accounts, social media accounts, email accounts, and/or web browsing to collect data associated with the user's purchase history, spending habits, payment habits, hobbies, interests, etc. In some cases, additional data may be collected by the user analysis module 113, such as from the user, via a purchase receipt uploaded by the user, so that line item purchase details may be extracted from the purchase receipt. In some cases, the additional data, such as line item purchase details, may be received from a merchant, such as the merchant computing device 140. In some cases, the user analysis module 113 may monitor and collect data from the user's identified friends. The user analysis module 113 may collect combined information associated with the purchases, spending habits, interests, and/or hobbies of the user's friends. In other instances, the user analysis module 113 may identify purchases, spending habits, interests, and/or hobbies that the group of friends and acquaintances have in common and only collect such common information. The user analysis module 113 may cause the collected information to be stored in the database 120 and/or in a memory associated with the first user computing device 130a.

At step 306, the user analysis module 113 may analyze, using a machine learning model, all or some of the collected data to identify spending patterns, payment patterns, whether the user pays on time, whether the user pays partial or full amounts on credit card balances, types or categories of products that the user likes or prefers, average spending for various categories of products, particular merchants preferred by the user, locations of merchants, a distance the user is willing to travel to purchase items, whether the user prefers to shop online or in a brick-and-mortar store, whether the user prefers to shop when items are on sale or when a discount is provided for the product, etc.

At step 308, the server 110 may utilize the user analysis module 113 to calculate the user's product proclivity, spending proclivity, and/or credit risk. The user analysis module 113 may use a machine learning model or a decision engine to calculate the user's product proclivity, spending proclivity, and credit risk based on the analysis of the collected data.

The user's product proclivity may indicate a likelihood that the user would be inclined to purchase a particular product or category of product. The user's spending proclivity may indicate a likelihood that the user would be inclined to spend a particular amount on a particular product or category of product, if the user were to purchase the product or category of product. The user's credit risk may indicate a credit risk or financial health associated with the user.

The machine learning model or decision engine may calculate the user's product proclivity, spending proclivity, and/or credit risk based on the data collected at step 304 that indicates, based on the user's purchase history, browsing history, hobbies, interests, financial health, credit-worthiness, or the like, the user's proclivity to purchase or spend particular amounts on particular products, categories of products, or the like and the potential credit risk associated with the user.

The user analysis module 113 may calculate a score, for example ranging from 0 to 100, for each of the user's product proclivity and spending proclivity as it relates to a particular product/service or category of products/services. The user analysis module 113 may additionally calculate a score, for example ranging from 10 to 100, for the user's credit risk. The user analysis module 113 may cause the calculated scores to be stored in the database 120 and/or in a memory associated with the first user computing device 130a.

At step 310, the server 110 may utilize the notification generation module 114 to generate one or more customized purchase notifications. The notification generation module 114 may use the various scores calculated by the user analysis module 113 to generate a ranked list of customized notifications related to particular products or categories of products for the user. The notifications may be related to specific products or for a category of products. The notifications may be related to particular merchants in some cases and in other cases might not be related to a particular merchant. The notifications may be related to offers, such as discounts, rebates, micro-credit offers (e.g., a reduced or promotional interest rate, no required minimum payments for a period of time, a credit limit increase, or the like), or other incentives to purchase a product or service. The notification generation module 114 may generate, for each of the customized notifications, a unique security key to be associated with the offer. The security key may be used to ensure that only the user for whom the notifications was generated may accept and redeem the included offer. The security key may be implemented as a hyperlink, a quick response (QR) code, a bar code, etc. and may be embedded with information identifying the notification or offer, such as a notification identification number.

At step 312, the server 110 may utilize the notification selection module 115 to determine a location of the user. The notification selection module 115 may determine a location of the user based on a location of the first user computing device 130a. The location may be determined using, for example, a GPS device associated with the first user computing device 130a.

At step 314, the server 110 may utilize the notification selection module 115 to determine one or more landmarks in proximity to the user based on the location of the first user computing device 130a. The landmarks may be merchants, vendors, stores, an aisle in a store, etc. that offer products or services for sale. The notification selection module 115 may further determine or narrow down the one or more landmarks based on determining that the first user computing device 130a is located with a predetermined distance from the landmark. In some cases, the predetermined distance may mean that the user computing device 130a is located inside of the landmark, such as inside of a merchant store, in an aisle of the merchant store, etc.

At step 316, the server 110 may utilize the notification selection module 115 to identify and analyze a website associated with one or more of the landmarks. The notification selection module 115 may identify a website associated with each of the determined one or more landmarks within the predetermined distance of the first user computing device 130a. The notification selection module 115 may analyze the website to identify one or more products or services offered by that landmark. In some instances, the server 110 may send a request, to a computing device associated with one or more of the landmarks, for a listing of the one or more products or services offered by that landmark, and the server 110 may receive, from corresponding computing device, the listing of the one or more products or services offered by that landmark.

In some cases, steps 306, 308, and 310 may additionally or alternatively be performed after step 316. That is, in some cases, a determination about the location of the user (step 312) and a determination about locations and associated websites of the landmarks in proximity to the user (steps 314 and 316) may be made prior to analyzing the collected data (step 306), calculating the user's product/spending proclivity and credit risk (step 308), and generating the ranked list of customized offers (step 310). In this case, the ranked list of customized notifications may be generated based on the location of the user, such that the notifications might not only be selected in real-time while the user is within proximity to the one or more landmarks, such as while the user is shopping at the landmark, but may also be generated in real-time while the user is within proximity to the one or more landmarks. And the notifications may be generated for any products or services determined to be offered for sale at the landmark and determined to likely be of interest to the user.

At step 318, the server 110 may utilize the notification selection module 115 to select one or more customized notifications to present to the user. The notification selection module 115 may compare the ranked list of customized notifications with the identified products and/or services offered at the landmarks within the predefined distance of the first user computing device 130a to select one or more notifications to present to the user. In some cases, the selection of the notification may be based on user preferences configured by the user during the system configuration process, or may be based on determinations made by a machine learning model.

At step 320, the server 110 may utilize the notification selection module 115 to output the selected one or more customized notifications. The notification selection module 115 may output the one or more notifications via the banking application 111, such as shown in user interfaces 400c and/or 400d in FIGS. 4C and 4D, while the user is within the predefined distance of the one or more landmark. For instance, the notification selection module 115 may output the one or more notifications while the user is shopping at a merchant store or is located in a particular aisle at the merchant store. The notification may include an advertisement, a warning, information about a product or service, information about one or more offers, or the like. For instance, the notification may identify a product or service and details about an offer. The notification may additionally or alternatively include a unique security key generated for the offer.

At step 322, the server 110 may utilize the notification selection module 115 to determine whether a request to redeem the offer is received. The user may request to redeem the offer by selecting or scanning, such as with an image capturing device, the security key that is provided in the notification. The notification selection module 115 may determine whether an indication that the security key was selected or scanned is received by the server 110.

If notification selection module 115 determines that an indication that the security key was selected or scanned within a predefined period of time is received, the notification selection module 115 may proceed to step 324. If the notification selection module 115 determines that the security key was not selected within a predefined period of time, the offer may be invalidated and the notification selection module 115 may proceed to step 332.

At step 324, the server 110 may utilize the authentication module 116 to perform an authentication and fraud detection process to authenticate redemption of the offer. That is, the authentication module 116 may perform a process to ensure that the user for whom the offer was generated is the individual redeeming the offer and is legitimately redeeming the offer. A process for performing authentication and fraud detection of the offer redemption is provided and described below with respect to FIG. 3B.

At step 326, if the authentication module 116 determines that the authentication is successful, the authentication module 116 may proceed to step 328, otherwise the authentication module 116 may proceed to step 332.

At step 328, the server 110 may utilize the offer processing module 117 to process the offer. The offer processing module 117 may apply the offer to an account, such as a bank account or a credit card account associated with the user. Applying the offer to the user's account may mean that the user's account may be credited with a monetary amount associated with the value of the offer or credit terms associated with the user's account may be modified or the like.

At step 330, the server 110 may utilize the offer processing module 117 to output a notification notifying the user that the offer was successfully processed. The offer processing module 117 may output the notification via the banking application 111.

At step 332, the server 110 may utilize the machine learning training module 118 to generate one or more training datasets using one or more machine learning models. The machine learning models may label the training datasets based on the manner in which the user responded to the customized notification. For example, if the user receives notification of an offer and decides to accept and redeem the offer, then after the offer has been successfully processed by the offer processing module 117, the machine learning training module 118 may cause the machine learning model to generate a training dataset comprising information and conditions related to the accepted offer labeled as 'redeemed,' so as to train the machine learning model with the types of offers that are of interest to the user and that the user is likely to redeem. The machine learning training module 118 may also generate training datasets in the case where the user receives notification of an offer and decides not to redeem the offer. The machine learning training module 118 may determine that the user decides not to redeem the offer if the selection or scanning of the security key is not received within a predefined period of time. In this case, the machine learning training module 118 may cause the machine learning model to generate a training dataset comprising information and conditions related to the unredeemed offer labeled as 'not redeemed.'

Figure 3B:
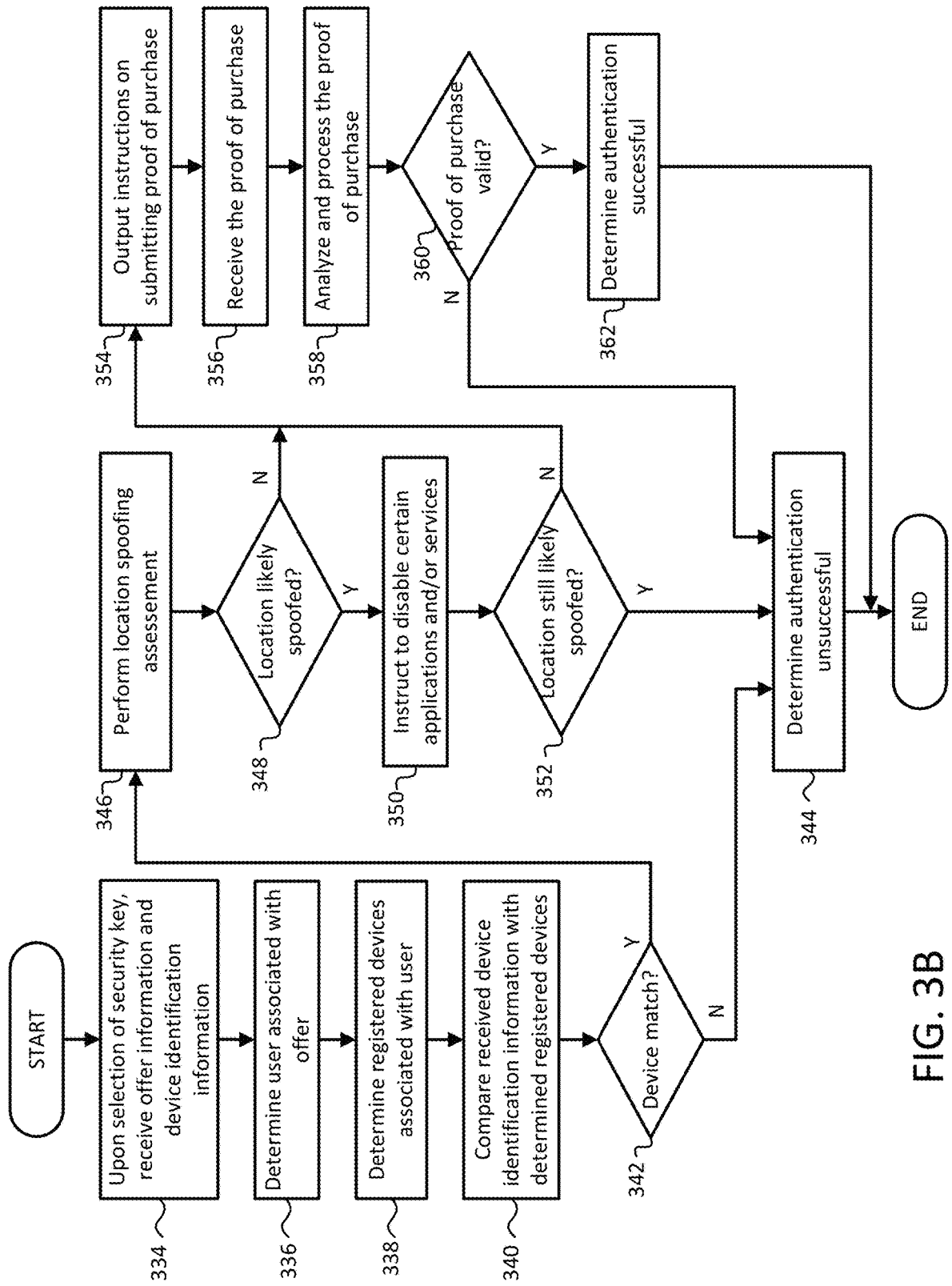

FIG. 3B discloses an example method of an authentication and fraud detection process in the notification generation and authentication system 100, in accordance with one or more aspects described herein. The example methods are described as being performed by the server 110, however the example methods may be performed by any one of the server 110, the one or more user computing devices 130, the computing device 200, and/or a combination thereof.

After one or more customized notifications are generated and selected for the user, the notifications may be output. The notification may include information about an offer, such as a description of a product or service and details about the offer. The notification may additionally or alternatively include a unique security key generated for the offer. The security key may be used to ensure that only the user for whom the notification was generated may redeem the offer. The security key may be implemented as a hyperlink, a QR code, a bar code, etc. and may be embedded with information identifying the notification or the offer, such as the notification identification number. The user may select or scan, using an image capturing device or bar/QR code reader application, the security key to redeem the offer.

Upon selection or scanning of the security key, the sever 110 may utilize the authentication module 116 to perform an authentication and fraud detection process to authentic redemption of the offer. In particular, at step 334, in response to selection and/or scanning of the security key, a script may be executed by the authentication module 116, which may cause identification information of the notification and/or offer and identification information of the device from which the security key was selected or scanned to be transmitted to the server 110. Additionally, the one or more operating parameters of the device from which the security key was selected or scanned may also be transmitted to the server 110.

At step 336, the authentication module 116 may query the database 120 using the identification information of the notification and/or offer to identify the user for whom the notification was generated.

At step 338, the authentication module 116 may further query the database 120 to determine stored identification information associated with one or more devices registered by the user to be used with the notification generation and authentication system 100.

At step 340, the authentication module 116 may compare the stored identification information associated with the user's registered devices with the received identification information of the device from which the security key was selected and/or scanned.

At step 342, the server 110 may control the authentication module 116 to determine whether the received identification information of the device from which the security key was selected and/or scanned matches identification information for one of the user's registered devices. If the information matches, the authentication module 116 may determine that the proper recipient attempts to redeem the offer and may proceed to step 346. If the information does not match, the authentication module 116 may determine that individual attempting to redeem the offer might not be the proper recipient of the offer and may proceed to step 344.

At step 344, the authentication module 116 may determine that the authentication was unsuccessful. In some cases, the authentication module 116 may require additional or different forms of authentication, when authentication is unsuccessful (in some cases, the additional or different forms of authentication may additionally be required as an additional level of protection even when the authentication of the offer redemption is successful). For instance, the authentication module 116 may require a password to be entered, a fingerprint scan, a facial scan, an iris scan, or the like and may attempt to on authenticate the user in this way. If the subsequent attempt at authentication is successful, the authentication module 116 may proceed to step 346, otherwise the process may end and the authentication module 116 may output a notification, such as via the banking application 111, that redemption of the offer could not be authenticated. In some cases, the offer may be invalidated upon unsuccessful redemption of the offer.

At step 346, if the authentication module 116 determines that the proper recipient attempts to redeem the offer, the authentication module 116 may then perform one or more assessments to determine whether the user's GPS location is accurate, to ensure that the user does not attempt to redeem an offer that she might not be entitled to based on her location. Accordingly, the authentication module 116 may analyze the one or more operating parameters received at step 334 to determine a likelihood that the GPS location of the device from which the security key was selected and/or scanned is being spoofed. For instance, the authentication module 116 may analyze the one or more operating parameters to determine whether certain applications known to perform location spoofing are operating on the device. The operating parameters may include an IP address associated with the device and the authentication module 116 may additionally or alternatively compare a location associated with the IP address with the GPS location of the device. The authentication module 116 may additionally compare the IP address with known virtual private network (VPN) IP addresses.

At step 348, if the authentication module 116 determines that it is likely that the GPS location is being spoofed, the authentication module 116 may proceed to step 350. If the authentication module 116 determines that it is not likely that the GPS location of the device is being spoofed, the authentication module 116 may proceed to step 354.

At step 350, the authentication module 116 may output a notification indicating that certain applications or VPN services on the device must be disabled prior to attempting to redeem the offer. After disabling the certain applications or VPN services, the user may be provided an opportunity to attempt to redeem the offer again, and the authentication module 116 may proceed to step 352, to determine again whether the GPS location is likely spoofed. After a threshold number of attempts, if the authentication module 116 determines that it remains likely that the GPS location of the device is being spoofed, the authentication module 116 may proceed to step 344 and determine that authentication is unsuccessful.

At step 354, if the authentication module 116 determines that the proper recipient attempts to redeem the offer and that the location of the device from which the offer is redeemed is likely not spoofed, then at step 354, the authentication module 116 may output a notification, via the banking application 111, that the user may purchase the product or service and that upon proof of purchase, the offer will be applied to an account associated with the user. The authentication module 116 may instruct the user on methods of providing proof of purchase. For instance, the authentication module 116 may provide instructions, such as shown in user interface 400g, to upload an image of a purchase receipt showing that the product or service associated with the redeemed offer was actually purchased. In some cases, the authentication module 116 may instruct the user to scan a bar code, QR code, or the like located on a packaging or a tag attached to the product when the user is at home.

At step 356, the authentication module 116 may receive the proof of purchase. For example, the user may upload an image of a purchase receipt or may scan a bar code or a QR code on a packaging or a tag associated with the product. The authentication module 116 may receive the uploaded receipt image or identification information associated with the bar code/QR code and may store such proof of purchase in the database 120 and/or in a memory associated with the first user computing device 130a.

At step 358, the authentication module 116 may analyze and process the received proof of purchase to identify a product or service associated with the provided proof. For instance, if the user uploaded a receipt as proof of purchase, the authentication module 116 may convert the receipt image to text and may analyze the receipt text to identify the purchase details included therein. If the user scanned a bar code or QR code attached to the packaging or a tag of a product, the authentication module 116 may identify, from the received identification information associated with the bar code/QR code, a name or description of the product that was scanned.

At step 360, the authentication module 116 may determine whether the proof of purchase is valid. That is, the authentication module 116 may determine whether identified product information for the provided proof reflects the product associated with the redeemed offer. For instance, the authentication module 116 may determine whether the purchase details extracted from a provided receipt or the product or service identified from a scanned bar code/QR code correspond to the product or service associated with the redeemed offer.

In some cases, when the proof of purchase is a scan of a bar code or QR code, the authentication module 116 may additionally capture a GPS location of the device that performed the scan at the time of the scanning to ensure that the user is not still located at the merchant store where the item was to be purchased in order to determine whether the proof of purchase is valid. If the product is scanned while still at the merchant store, the authentication module 116 may determine that the proof of purchase is not valid.

The authentication module 116 may also compare a time of redemption of the offer with a time of the scanning of the packaging or tag of the product to determine whether the proof of purchase is valid. If the product is scanned prior to redemption of the offer, the authentication module 116 may determine that the proof of purchase is not valid.

The authentication module 116 may additionally make a further determination, based on again receiving one or more operating parameters of the device, of whether a GPS location of the device is likely spoofed to determine whether the proof of purchase is valid. If the authentication module 116 determines that the location of the device is likely spoofed, the authentication module 116 may determine that the proof of purchase is not valid.

If the authentication module 116 determines that the proof of purchase is valid, the authentication module 116 may proceed to step 362 to authenticate redemption of the offer. If the authentication module 116 determines that the proof of purchase is not valid, the authentication module 116 may proceed to step 344 to determine that authentication is unsuccessful.

At step 362, upon determining that authentication is successful, the authentication module 116 might notify the offer processing module 117 that the offer may be processed, such as provided in step 328 of FIG. 3A.

One or more aspects disclosed herein may be embodied in computer-usable or readable data and/or computer-executable instructions, such as in one or more program modules, executed by one or more computers or other devices as described herein. Generally, program modules include routines, programs, objects, components, data structures, or the like that perform particular tasks or implement particular abstract data types when executed by a processor in a computer or other device. The modules may be written in a source code programming language that is subsequently compiled for execution, or may be written in a scripting language, such as (but not limited to) HTML or XML. The computer-executable instructions may be stored on a computer-readable medium, such as a hard disk, optical disk, removable storage media, solid-state memory, RAM, or the like. As will be appreciated by one of skill in the art, the functionality of the program modules may be combined or distributed as desired in various embodiments. In addition, the functionality may be embodied in whole, or in part, in firmware or hardware equivalents such as integrated circuits, field programmable gate arrays (FPGA), or the like. Particular data structures may be used to more effectively implement one or more aspects disclosed herein, and such data structures are contemplated within the scope of computer-executable instructions and computer-usable data described herein. Various aspects disclosed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method comprising:
training, using training data, a machine learning model to determine a likelihood that a training user would redeem a pre-labeled offer, wherein the training data comprises:
pre-labeled offer information indicating whether the pre-labeled offer has been redeemed by the training user,
product information for the pre-labeled offer, and
a distance between a training landmark and a location of a computing device associated with the training user when the pre-labeled offer was generated;
determining, by a computing device, a location of a mobile device of a first user;
querying, based on the location of the mobile device, a database to determine locations of one or more landmarks;
selecting, based on a distance between the location of the mobile device and the locations of the one or more landmarks, a first landmark of the one or more landmarks;
analyzing, utilizing a script configured to identify key words on a web page associated with the first landmark, the web page to obtain information identifying one or more products associated with the first landmark;
determining the mobile device is within a predetermined distance of the first landmark;
in response to determining that the mobile device is within the predetermined distance of the first landmark:
receiving, from the mobile device, one or more operating parameters comprising an Internet protocol (IP) address of the mobile device;
based on determining that a location associated with the IP address does not match the location of the mobile device, sending, to the mobile device, a notification to disable a virtual private network (VPN) service on the mobile device;
in response to sending, receiving an indication that the VPN service is disabled on the mobile device;
providing, as input to the trained machine learning model, a purchase history associated with the first user, the location of the mobile device of the first user and a location of the first landmark;
receiving, as output from the trained machine learning model and based on the purchase history associated with the first user, a likelihood that the first user would redeem an offer for a first product of the one or more identified products; and
based on the likelihood that the first user would redeem the offer for the first product, transmitting, to the mobile device of the first user, a notification of the offer, wherein the notification of the offer includes a security key for accessing the offer, and wherein the security key comprises a hyperlink or a quick response (QR) code;
receiving an indication of a selection of the security key;
in response to receiving the indication of the selection of the security key:
receiving identification information of a device sending the indication of the selection of the security key;
detecting a distance between the first landmark and the device sending the indication of the selection of the security key; and
authenticating, based on determining that the identification information of the device sending the indication of the selection of the security key matches identification information associated with one or more devices of the first user and based on the distance between the first landmark and the device sending the indication of the selection of the security key, the first user; and
applying, based on authentication of the first user, the offer to an account associated with the first user.

2. The method of claim 1, wherein authenticating the first user comprises: receiving, in response to the selection of the security key, security key information comprising information related to the offer; querying, based on the security key information, a database to determine a user for whom the notification of the offer was generated, wherein the user for whom the notification of the offer was generated is the first user; and querying the database to determine the identification information associated with one or more devices of the first user.

3. The method of claim 2, wherein the one or more devices of the first user comprise the mobile device of the first user or a different device of the first user.

4. The method of claim 1, further comprising: determining, using the trained machine learning model, the purchase history associated with the first user, wherein the purchase history comprises information indicating one or more of: spending patterns associated with the first user, products preferred by the first user, merchants preferred by the first user, or average spending of the first user for different categories of products.

5. The method of claim 1, wherein authenticating the first user further comprises: updating the trained machine learning model with information associated with the offer comprising a distance between the training landmark and the location of the training user when a security key associated with the pre-labeled offer was selected by the training user computing device; and determining, using the updated machine learning model and based on the distance between the first landmark and the device sending the indication of the selection of the security key, a likelihood that the first user has redeemed the offer, wherein applying the offer to an account associated with the first user is further based on the likelihood that the first user has redeemed the offer.

6. The method of claim 1, wherein generating the offer comprises: receiving, from the mobile device, information indicating that the first user performed web browsing for the first product, wherein generating the notification of the offer is further based on the information indicating that the first user performed the web browsing for the first product.

7. The method of claim 1, further comprising: updating, after receiving the indication of the selection of the security key and after authenticating the first user, the trained machine learning model with information associated with the offer, wherein the information associated with the offer further comprises one or more of: the first product, the first landmark, a date and time of transmission of the notification of the offer, a date and time of the selection of the security key, a date and time associated with the information indicating that the first user purchased the first product, a value associated with the offer, a type of the offer, or a price of the first product at the first landmark.

8. The method of claim 1, further comprising: querying a database associated with the first landmark to determine a stock level of the one or more identified products associated with the first landmark; and generating the notification based on the stock level of the one or more identified products.

9. The method of claim 1, further comprising determining the purchase history associated with the first user based on: monitoring one or more email accounts associated with the first user to identify communications comprising purchase receipts or payment notifications; monitoring one or more social media accounts associated with the first user to identify text or images indicative of purchases made by the first user; or monitoring a web browsing history associated with the first user to identify purchases made by the first user.

10. The method of claim 1, wherein generating the notification of the offer for the first product is further based on: analyzing, using the trained machine learning model, the purchase history associated with the first user to generate one or more of a product score and a spending score; generating, based on one or more of the product score and the spending score, a ranked list of one or more notifications associated with one or more products; and selecting, from the ranked list of the one or more notifications, the notification of the offer for the first product.

11. A computing device comprising:
one or more processors; and
memory storing instructions that, when executed by the one or more processors, cause the computing device to:
train, using training data, a machine learning model to determine a likelihood that a training user would redeem a pre-labeled offer, wherein the training data comprises:
pre-labeled offer information indicating whether the pre-labeled offer has been redeemed by the training user,
product information for the pre-labeled offer, and
a distance between a training landmark and a location of a computing device associated with the training user when the pre-labeled offer was generated;
determine a location of a mobile device of a first user;
query, based on the location of the mobile device, a database to determine locations of one or more landmarks;
select, based on a distance between the location of the mobile device and the locations of the one or more landmarks, a first landmark of the one or more landmarks;
analyze, utilizing a script configured to identify key words on a web page associated with the first landmark, the web page to obtain information identifying one or more products associated with the first landmark;
while the mobile device is within a predetermined distance of the first landmark:
receive, from the mobile device, one or more operating parameters comprising an internet protocol (IP) address of the mobile device;
based on determining that a location associated with the IP address does not match the location of the mobile device, send, to the mobile device, a notification to disable a virtual private network (VPN) service on the mobile device;
in response to sending, receive an indication that the VPN service is disabled on the mobile device;
provide, as input to the trained machine learning model, a purchase history associated with the first user, the location of the mobile device of the first user and a location of the first landmark;
receive, as output from the trained machine learning model and based on the purchase history associated with the first user, a likelihood that the first user would redeem an offer for a first product of the one or more identified products; and
based on the likelihood that the first user would redeem the offer for the first product, transmit, to the mobile device of the first user, a notification of the offer, wherein the notification of the offer includes a security key for accessing the offer, and wherein the security key comprises a hyperlink or a quick response (QR) code;
receive an indication of a selection of the security key;
in response to receiving the indication of the selection of the security key:
receive identification information of a device sending the indication of the selection of the security key;
detect a distance between the first landmark and the device sending the indication of the selection of the security key;
authenticate, based on a determination that the identification information of the device sending the indication of the selection of the security key matches identification information associated with one or more devices of the first user, the first user and based on the distance between the first landmark and the device sending the indication of the selection of the security key; and
apply, based on authentication of the first user, the offer to an account associated with the first user.

12. The computing device of claim 11, wherein the instructions, when executed by the one or more processors, cause the computing device to authenticate the first user by causing the computing device to: receive, in response to the selection of the security key, security key information comprising information related to the offer; query, based on the security key information, a database to determine a user for whom the notification of the offer was generated, wherein the user for whom the notification of the offer was generated is the first user; and query the database to determine the identification information associated with one or more devices of the first user.

13. The computing device of claim 12, wherein the one or more devices of the first user comprise the mobile device of the first user or a different device of the first user.

14. The computing device of claim 11, wherein the instructions, when executed by the one or more processors, further cause the computing device to: determine, using the trained machine learning model, the purchase history associated with the first user, wherein the purchase history comprises information indicating one or more of: spending patterns associated with the first user, products preferred by the first user, merchants preferred by the first user, or average spending of the first user for different categories of products.

15. The computing device of claim 11, wherein the instructions, when executed by the one or more processors, further cause the computing device to: update the trained machine learning model with information associated with the offer comprising a distance between the training landmark and the location of the training user when a security key associated with the pre-labeled offer was selected by the training user computing device; and determine, using the updated machine learning model and based on the distance between the first landmark and the device sending the indication of the selection of the security key, a likelihood that the first user has redeemed the offer, wherein applying the offer to an account associated with the first user is further based on the likelihood that the first user has redeemed the offer.

16. The computing device of claim 11, wherein the instructions, when executed by the one or more processors, further cause the computing device to: receive, from the mobile device, information indicating that the first user performed web browsing for the first product; and generate the notification of the offer based on the information indicating that the first user performed the web browsing for the first product.

17. The computing device of claim 11, wherein the instructions, when executed by the one or more processors, further cause the computing device to: update, after receiving the indication of the selection of the security key and after authenticating the first user, the trained machine learning model with information associated with the offer, wherein the information associated with the offer further comprises one or more of: the first product, the first landmark, a date and time of transmission of the notification of the offer, a date and time of the selection of the security key, a date and time associated with the information indicating that the first user purchased the first product, a value associated with the offer, a type of the offer, or a price of the first product at the first landmark.

18. One or more non-transitory, computer-readable media storing instructions that, when executed by one or more processors of a computing device, cause the computing device to:
   train, using training data, a machine learning model to determine a likelihood that a training user would redeem a pre-labeled offer, wherein the training data comprises:
      pre-labeled offer information indicating whether the pre-labeled offer has been redeemed by the training user,
      product information for the pre-labeled offer, and
      a distance between a training landmark and a location of a computing device associated with the training user when the pre-labeled offer was generated;
   determine a location of a mobile device of a first user;
   query, based on the location of the mobile device, a database to determine locations of one or more landmarks;
   select, based on a distance between the location of the mobile device and the locations of the one or more landmarks, a first landmark of the one or more landmarks;
   determine a website associated with the first landmark;
   analyze, utilizing a script configured to identify key words on the website, the website to identify one or more products associated with the first landmark;
   while the mobile device is within a predetermined distance of the first landmark:
      receive, from the mobile device, one or more operating parameters comprising an internet protocol (IP) address of the mobile device;
      based on determining that a location associated with the IP address does not match the location of the mobile device, send, to the mobile device, a notification to disable a virtual private network (VPN) service on the mobile device;
      in response to sending, receive an indication that the VPN service is disabled on the mobile device;
      provide, as input to the trained machine learning model, a purchase history associated with the first user, the location of the mobile device of the first user and a location of the first landmark;
      receive, as output from the trained machine learning model and based on the purchase history associated with the first user, a likelihood that the first user would redeem an offer for a first product of the one or more identified products; and
      based on the likelihood that the first user would redeem the offer for the first product, transmit, to the mobile device of the first user, a notification of the offer, wherein the notification includes a security key for accessing the offer, and wherein the security key comprises a hyperlink or a quick response (QR) code;
   receive an indication of a selection of the security key;
   in response to receiving the indication of the selection of the security key:
      receive identification information of a device sending the indication of the selection of the security key;
      detect a distance between the first landmark and the device; and send the indication of the selection of the security key;
      authenticate, based on a determination that the identification information of the device sending the indication of the selection of the security key matches identification information associated with one or more devices of the first user and the distance between the first landmark and the device sending the indication of the selection of the security key, the first user; and
   apply, based on authentication of the first user, the offer to an account associated with the first user.

19. The one or more non-transitory, computer-readable media of claim 18, wherein the instructions, when executed by the one or more processors, cause the computing device to authenticate the first user by causing the computing device to: receive, in response to the selection of the security key, security key information comprising information related to the offer; query, based on the security key information, a database to determine a user for whom the notification of the offer was generated, wherein the user for whom the notification of the offer was generated is the first user; and query the database to determine the identification information associated with one or more devices of the first user.

20. The one or more non-transitory, computer-readable media of claim 18, wherein the instructions, when executed by the one or more processors, cause the computing device to: update the trained machine learning model with information associated with the offer comprising a distance between the training landmark and the location of the training user when a security key associated with the pre-labeled offer was selected by the training user computing device; and determine, using the updated machine learning model and based on the distance between the first landmark and the device sending the indication of the selection of the security key, a likelihood that the first user has redeemed the offer, wherein applying the offer to an account associated with the first user is further based on the likelihood that the first user has redeemed the offer.

21. The one or more non-transitory, computer-readable media of claim 18, wherein the instructions, when executed by the one or more processors, cause the computing device to: update, after receiving the indication of the selection of the security key and after authenticating the first user, the trained machine learning model with information associated with the offer, wherein the information associated with the offer further comprises one or more of: the first product, the first landmark, a date and time of transmission of the notification of the offer, a date and time of the selection of the security key, a date and time associated with the information indicating that the first user purchased the first product, a value associated with the offer, a type of the offer, or a price of the first product at the first landmark.

* * * * *